(12) United States Patent
Nielsen et al.

(10) Patent No.: US 11,738,679 B2
(45) Date of Patent: Aug. 29, 2023

(54) TRAILER EMPLOYING ROLLER ELEMENTS AND A DOUBLE GOOSENECK SUPPORT ASSEMBLY

(71) Applicant: Trail King Industries, Inc., Mitchell, SD (US)

(72) Inventors: Matthew J. Nielsen, Mitchell, SD (US); Scot J. Vander Pol, Mitchell, SD (US); Trevor L. Gunderson, Mitchell, SD (US); Kevin L. Pullin, London, OH (US)

(73) Assignee: Trail King Industries, Inc., Mitchell, SD (US)

( * ) Notice: Subject to any disclaimer, the term of this patent is extended or adjusted under 35 U.S.C. 154(b) by 0 days.

(21) Appl. No.: 17/566,436

(22) Filed: Dec. 30, 2021

(65) Prior Publication Data

US 2023/0046293 A1    Feb. 16, 2023

Related U.S. Application Data

(60) Provisional application No. 63/231,358, filed on Aug. 10, 2021.

(51) Int. Cl.
*B60P 1/52* (2006.01)
*B60P 1/43* (2006.01)

(52) U.S. Cl.
CPC ............... *B60P 1/52* (2013.01); *B60P 1/433* (2013.01)

(58) Field of Classification Search
CPC ................................. B60P 1/52; B60P 1/433
See application file for complete search history.

(56) References Cited

U.S. PATENT DOCUMENTS

| | | | | | |
|---|---|---|---|---|---|
| 3,850,283 | A | * | 11/1974 | Nordstrom | B64F 1/322 198/313 |
| 4,887,937 | A | * | 12/1989 | Thunnissen | B60P 1/52 414/535 |
| 5,490,754 | A | * | 2/1996 | Voelzke | B60P 1/433 296/184.1 |
| 9,315,138 | B1 | * | 4/2016 | Dierks | B60P 1/433 |
| 10,099,596 | B1 | * | 10/2018 | Biagi | B60P 1/436 |

* cited by examiner

*Primary Examiner* — Jonathan Snelting
(74) *Attorney, Agent, or Firm* — Nelson Mullins Riley & Scarborough LLP; Anthony A. Laurentano

(57) ABSTRACT

A trailer having a main deck portion having a main deck surface, an upper deck portion having an upper deck surface, a connecting frame assembly, a plurality of rollers elements, and a tailgate. The connecting frame assembly can couple together the main deck portion and the upper deck portion. The roller elements can be arranged in one or more rows and can be mounted in the main deck surface or the upper deck surface so as to cover a substantial portion of the main deck surface or the upper deck surface. The tailgate can be coupled to the main deck portion and can be movable between a closed position and an open position.

26 Claims, 23 Drawing Sheets

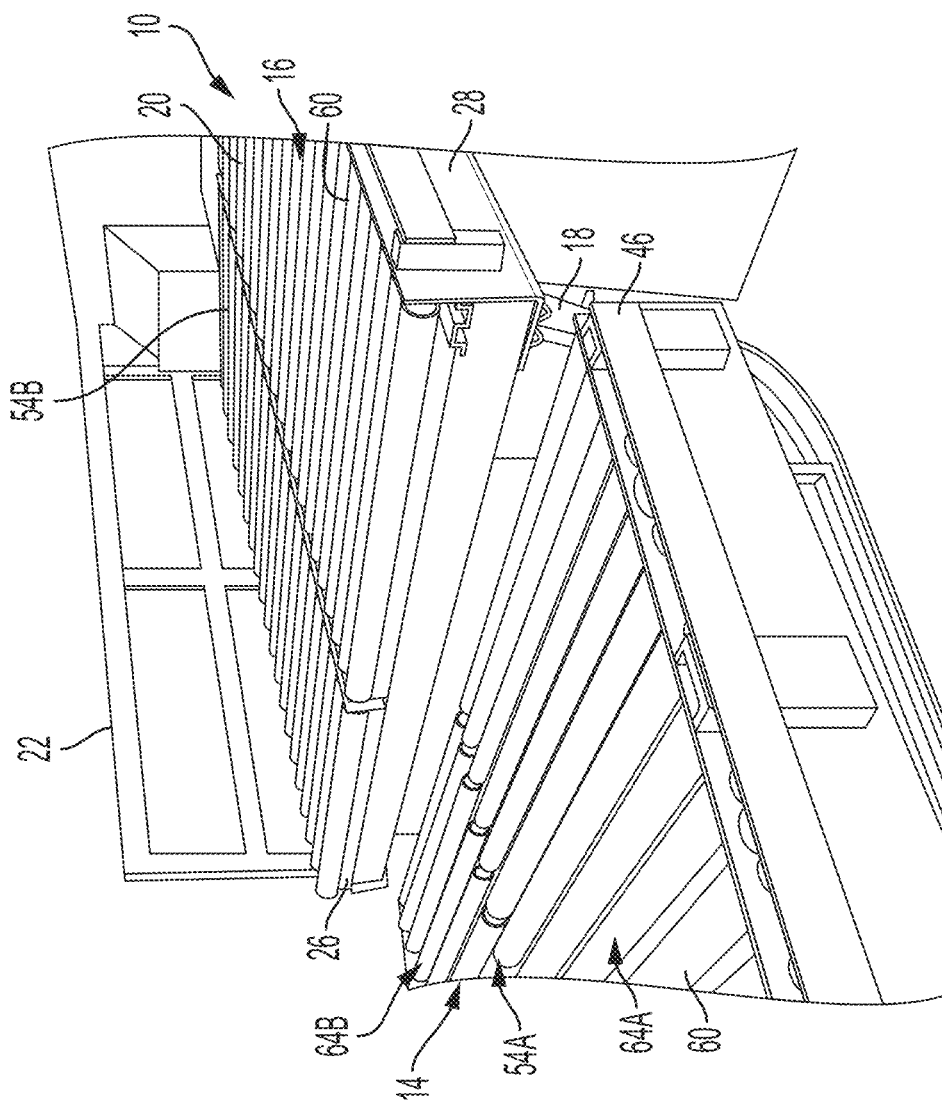

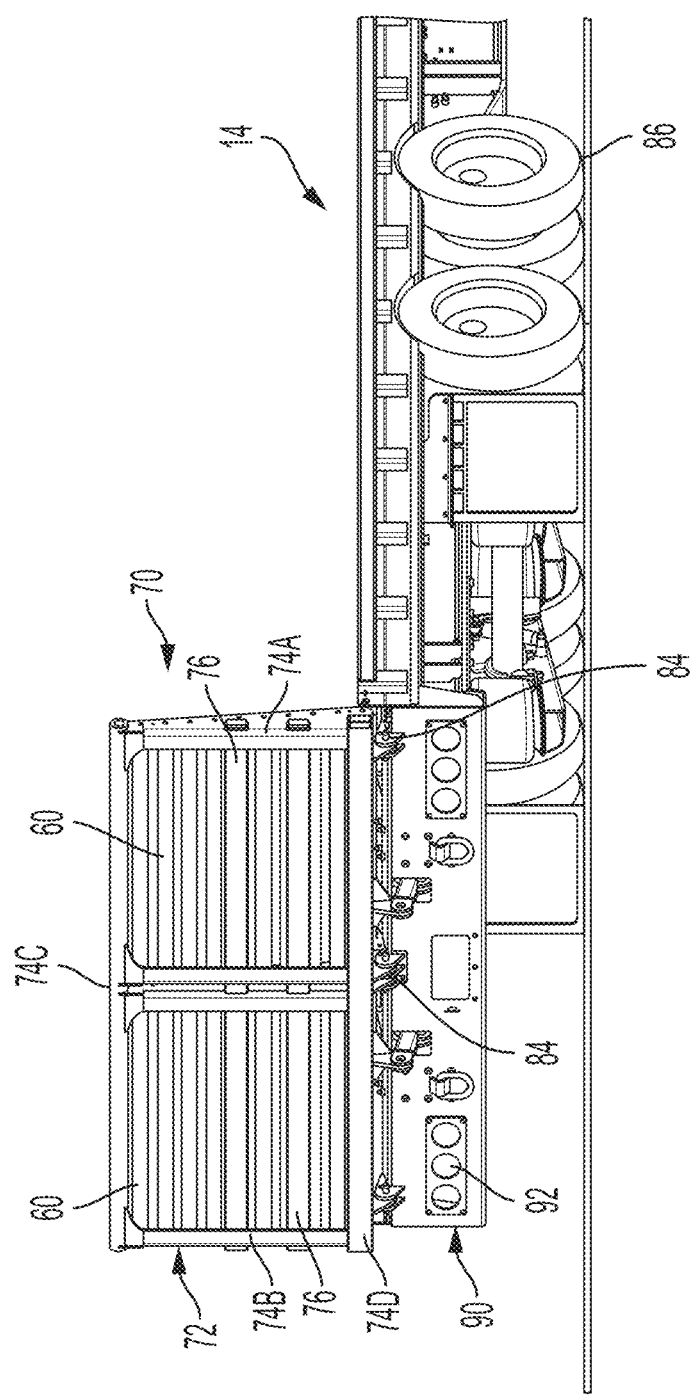

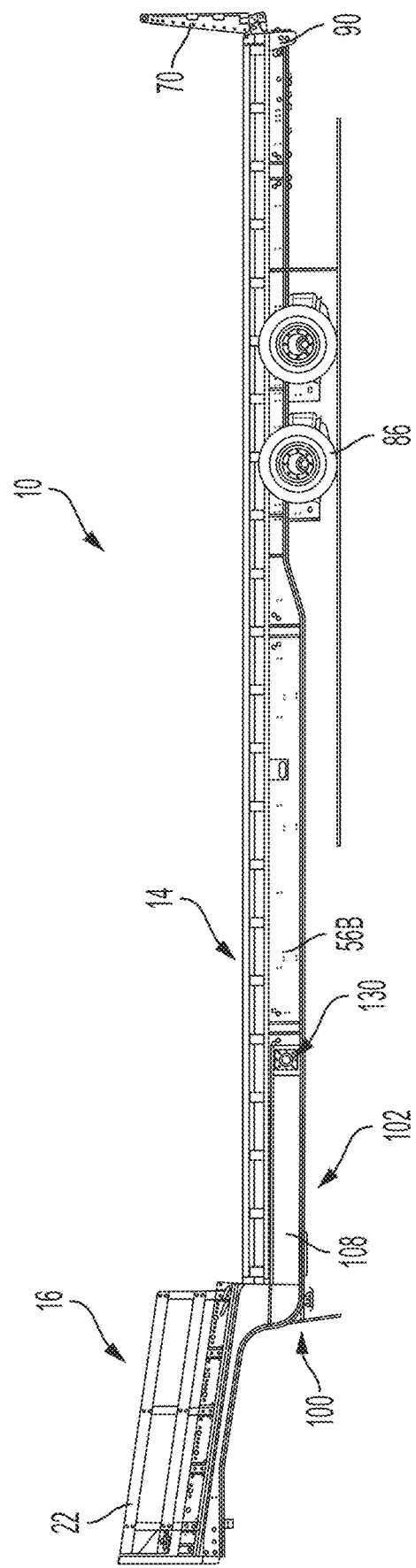

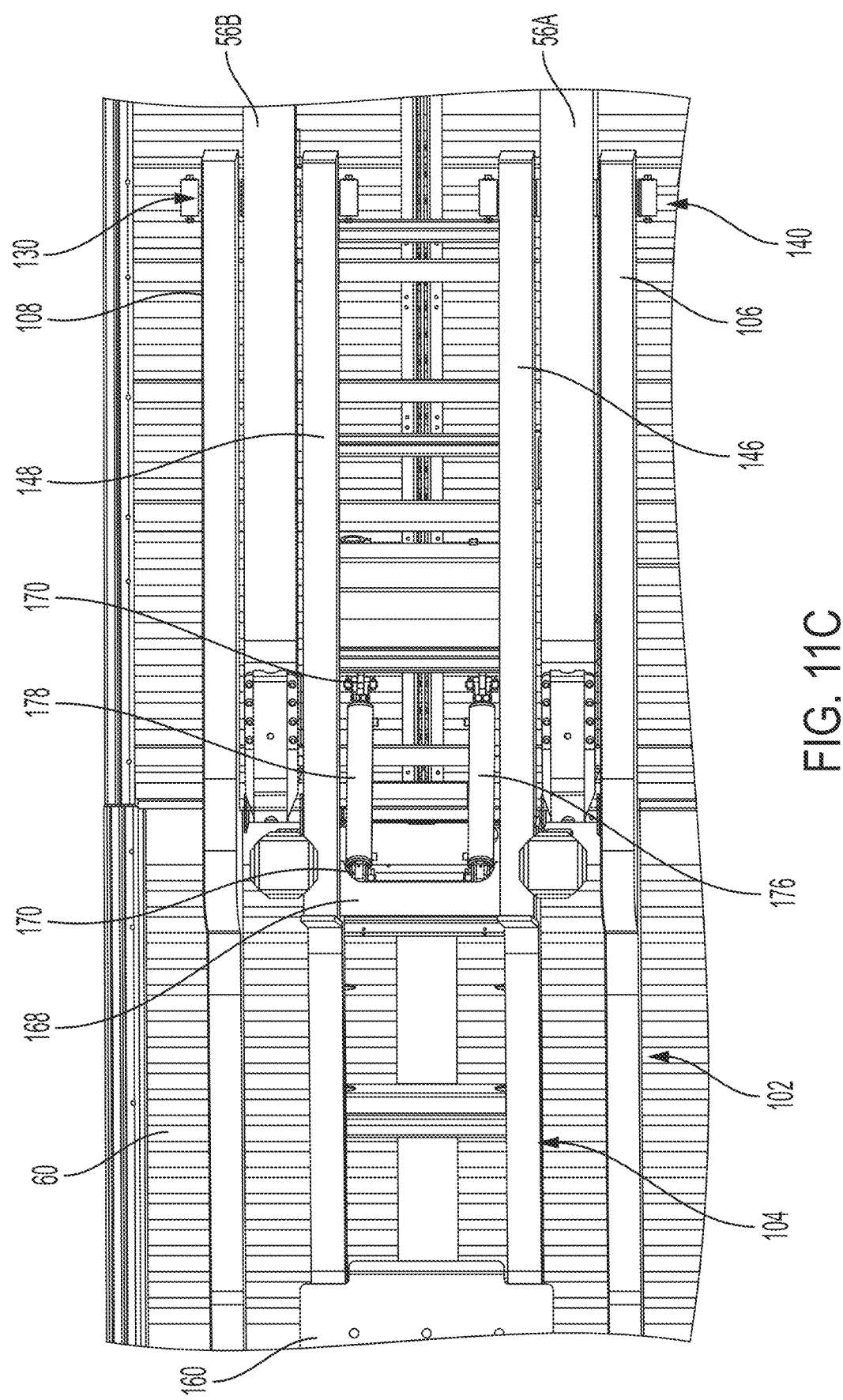

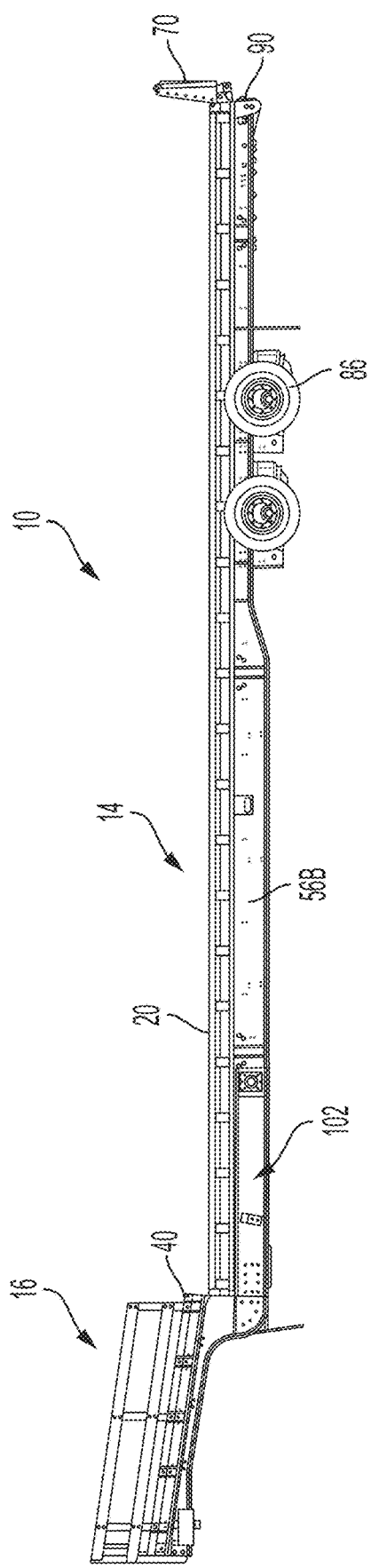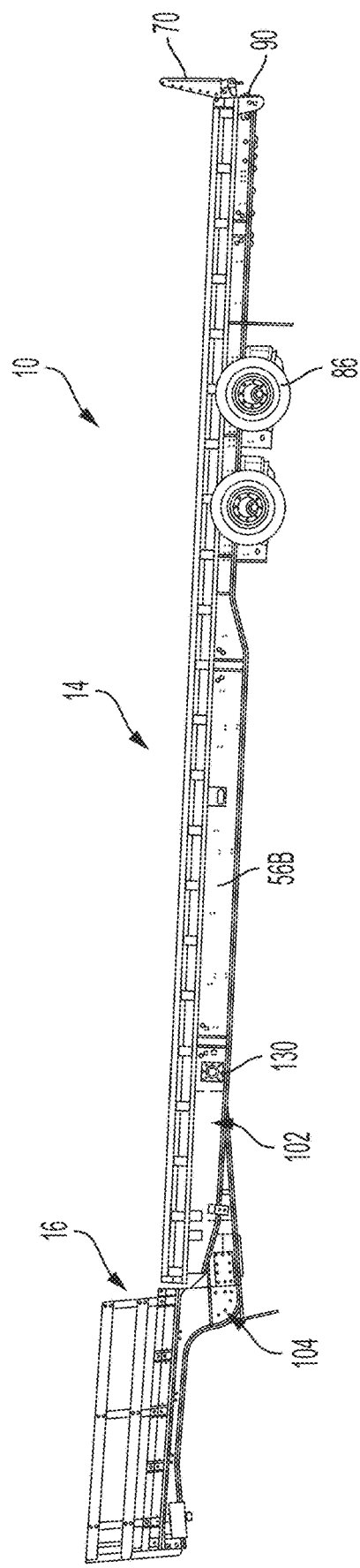

TRAILER EMPLOYING ROLLER ELEMENTS AND A DOUBLE GOOSENECK SUPPORT ASSEMBLY

RELATED APPLICATION

The present application claims priority to U.S. provisional patent application Ser. No. 63/231,358, filed on Aug. 10, 2021, and entitled TRAILER EMPLOYING ROLLER ELEMENTS, the contents of which are herein incorporated by reference.

BACKGROUND OF THE INVENTION

Transport vehicles for loading and transporting a payload or other equipment are known in the art. An example of a common type of transport vehicle is a trailer, such as a flatbed trailer, that can be easily coupled to a vehicle, such as a truck or other means of transportation. The trailer typically has a loading surface, such as a flatbed style main section, that has a set of wheels at a rearward work or unloading end for supporting the flatbed trailer and an opposed support end for connection to the transport vehicle, which provides support to the trailer. The main section can be tiltable or movable relative to the plane of the road surface such that the back end of the trailer bed is moved closer to the ground.

A problem with conventional flatbed trailers is that they typically are not able to be tilted to a sufficient degree to allow the payload stored on the flat main section to be easily removed therefrom, since the back edge of the trailer typically contacts the ground well before the bed can be tilted to a sufficient degree or angle to allow the payload to easily slide off of or be removed from the main section.

SUMMARY OF THE INVENTION

In one example, a trailer having a main deck portion and an upper deck portion is provided. The main deck portion and the upper deck portion can be independently movable relative to each other. The main and upper deck portions can be configured to include one or more sets of rollers that extend over a substantial portion of the width and length (e.g., area) of the surfaces of the deck portions. The rollers may allow the trailer to easily unload a payload when at least one of the deck portions is tilted relative to the ground.

In one example, a connecting frame assembly is provided that couples the upper and main deck portions together. The connecting frame assembly can employ a pair of inner and outer frame subassemblies that can be movable relative to each other. According to one embodiment, the inner and outer frame subassemblies can include a curved portion (e.g., gooseneck). The inner and outer frame subassemblies can be coupled together at a common pivot point. The inner frame subassembly is generally stationary at the point where the inner frame is secured to the truck and the outer frame subassembly is movable relative to the inner frame subassembly.

In one example, an actuation assembly for actuating a tailgate portion of the trailer is provided. The actuation assembly can include a linkage assembly that is coupled at one end to the tailgate and at an opposed end to one or more bladders. When the one or more bladders is/are actuated or expanded, the tailgate can be moved into a closed position, and when the one or more bladders is/are deflated the gate can be moved into an open position.

According to one embodiment, a trailer is provided having a main deck portion, an upper deck portion, a connecting frame assembly, a plurality of rollers elements, and a tailgate. The main deck portion can include a main frame assembly extending along a longitudinal axis having opposed side frame elements, opposed top and bottom frame elements that are coupled together, and first and second parallel and longitudinally extending roller support elements. The frame elements and the roller support elements can define a main deck surface. The upper deck portion can include an upper frame assembly having opposed side frame elements and opposed top and bottom frame elements that are coupled together. The frame elements of the upper deck portion can define an upper deck surface. The connecting frame assembly can couple together the main deck portion and the upper deck portion. The roller elements can be arranged in one or more rows and can be mounted in the main deck surface or the upper deck surface so as to cover a substantial portion of the main deck surface or the upper deck surface. Further, the tailgate can be coupled to the main deck portion and can be movable between a closed position and an open position.

According one example, each of the upper frame assembly and the main frame assembly can include a plurality of lateral support arms that span between the side frame elements. The plurality of lateral support arms in the main frame assembly extend between the side frame elements and the first and second roller support elements and function as structural stiffeners for the main frame assembly to help support a payload when loaded on the main deck surface.

According to another example, each of the upper frame assembly and the main frame assembly can include one or more longitudinal frame elements disposed between the side frame elements and which extend along a longitudinal length of the upper deck surface and the main deck surface from the top frame element to the bottom frame element. The longitudinal frame element is disposed along a central portion of one or more of the deck surfaces. For example, the longitudinal frame element of the main frame assembly can divide a surface area of the main deck surface into a plurality of bed areas having a first bed area that is formed between the one or more longitudinal frame elements and a first one of the longitudinally extending side frame elements, and a second bed area that is formed between the one or more longitudinal frame elements and an opposed second one of the longitudinally extending side frame elements. Further, the optional longitudinal frame element of the upper frame assembly can divide a surface area of the upper deck surface into a plurality of bed areas having a first bed area that is formed between the one or more longitudinal frame elements and a first one of the longitudinally extending side frame elements, and a second bed area that is formed between the one or more longitudinal frame elements and an opposed second one of the longitudinally extending side frame elements. The first and second bed areas of the main deck surface mounts a plurality of the roller elements arranged in a row to form first and second rows of the roller elements, and each of the first and second bed areas of the upper deck surface mounts a plurality of the roller elements arranged in a row to form first and second rows of the roller elements.

According to another example, the tailgate includes a tail frame assembly having opposed side frame elements and opposed top and bottom frame elements that are coupled together, a plurality of lateral support arms, and one or more longitudinal frame elements that are coupled to the plurality of lateral support arms. The side frame elements, the top and bottom frame elements, the lateral support arms, and the one or more longitudinal frame elements define a tailgate deck surface. The longitudinal frame element can divide a surface area of the tailgate deck surface into a plurality of bed areas having a first bed area that is formed between the one or more longitudinal frame elements and a first one of the longitudinally extending side frame elements, and a second bed area that is formed between the one or more longitudinal frame elements and an opposed second one of the longitudinally extending side frame elements. Further, each of the first and second bed areas of the tailgate deck surface mounts the roller elements such that the roller elements are arranged in a row to form first and second rows of the roller elements.

According to still another example, the main deck surface includes one or more relatively flat non-roller sections, and the main deck portion is independently movable relative to the upper deck portion.

The connecting frame assembly can include an outer frame assembly having a first outer frame arm and a second outer frame arm, and an inner frame assembly having a first inner frame arm and a second inner frame arm. The outer frame assembly and the inner frame assembly are coupled to the first and second roller support elements. Further, the outer frame assembly and the inner frame assembly are coupled to the first roller support element by a first pivoting assembly to form a first pivot point and to the second roller support element by a second pivoting assembly to form a second pivot point.

The first outer frame arm of the outer frame assembly can include a proximal portion coupled to the first roller support element by the first pivoting assembly, an opposed distal portion coupled to an underside of the upper deck portion, and a curved intermediate portion coupling together the proximal portion and the distal portion. The second outer frame arm of the outer frame assembly can include a proximal portion coupled to the second roller support element by the second pivoting assembly, an opposed distal portion coupled to an underside of the upper deck portion, and a curved intermediate portion coupling together the proximal portion and the distal portion.

According to yet another example, the first inner frame arm of the inner frame assembly can include a proximal portion coupled to the first roller support element by the first pivoting assembly, an opposed distal portion coupled to an underside of the upper deck portion, and a curved intermediate portion coupling together the proximal portion and the distal portion. The second inner frame arm of the inner frame assembly can include a proximal portion coupled to the second roller support element by the second pivoting assembly, an opposed distal portion coupled to an underside of the upper deck portion, and a curved intermediate portion coupling together the proximal portion and the distal portion. The curved intermediate portions are configured to have a gooseneck type shape, and the outer frame assembly is pivotably movable about the first and second pivot points.

The inner frame assembly can also include first and second piston elements that are coupled at one end to the inner frame assembly and are coupled at an opposed end to an underside of the main deck portion. As such, upon actuation of the first and second piston elements, the piston elements press against the underside of the main deck portion so as to tilt the main deck portion about the first and second pivot points.

According to still yet another example, the trailer can include an actuation assembly that is coupled to an underside of the main deck portion for moving the tailgate between the closed position and the open position. The actuation assembly can include first and second bladders coupled at a first end to the underside of the main deck portion, a linear slide element coupled to a second end of the first and second bladders, and a linkage assembly coupled at one end to the linear slide element and at an opposed end to the tailgate. The trailer can also include a securing mechanism for securing the tailgate in the closed position. As such, when the bladders are actuated, the bladders move the linear slide element and the linkage assembly in a longitudinal direction toward the tailgate so as to move the tailgate into the closed position. When the bladders are not actuated, the linear slide element and the linkage assembly moves in the longitudinal direction away from the tailgate so as to move the tailgate into the open position.

BRIEF DESCRIPTION OF THE DRAWINGS

These and other features and advantages of the present disclosure will be more fully understood by reference to the following detailed description in conjunction with the attached drawings in which like reference numerals refer to like elements throughout the different views. The drawings illustrate principals of the disclosure and, although not to scale, show relative dimensions.

FIG. 4A is a close-up view of the front support end of the main deck portion of the trailer of FIG. 1.

FIG. 5 is a perspective view of a rear portion of the trailer of FIG. 1.

FIG. 6 is a side view of the trailer of FIG. 1.

FIGS. 11C-11E are bottom views of the deck portions of the trailer showing the inner and outer frame subassemblies and associated piston elements in various operating positions.

FIGS. 14A-14D are side views of the trailer of FIG. 1 showing the positions of the upper and main deck portions and the inner and outer frame subassemblies, relative to each other.

DETAILED DESCRIPTION

Figure 1:
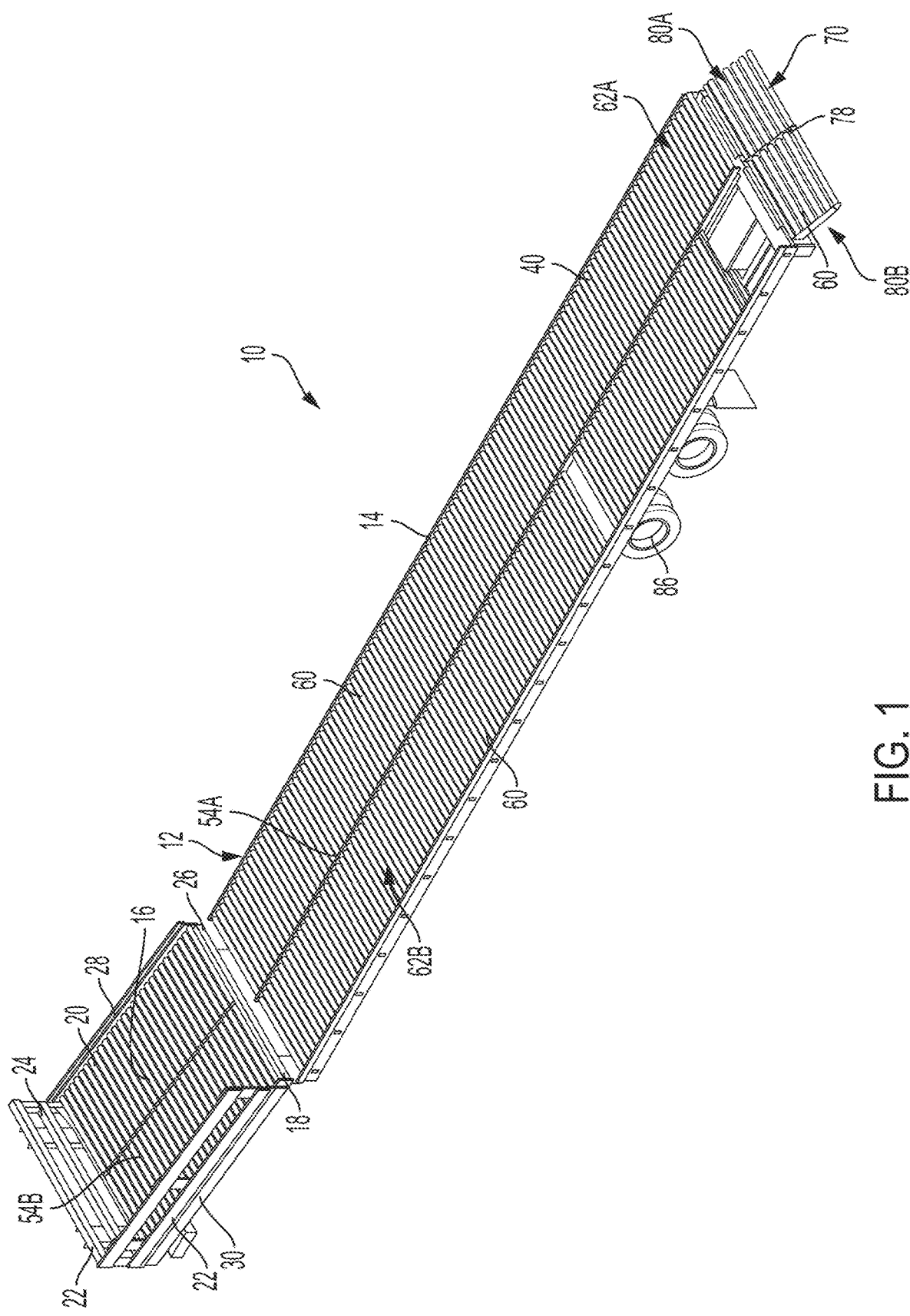
FIG. 1 is a perspective view of a trailer employing a plurality of roller elements on a main deck portion and on an upper deck portion.

Reference will now be made in detail to embodiments of the present disclosure, one or more examples of which are illustrated in the accompanying drawings. Each example is provided by way of explanation of the disclosure, not limitation of the disclosure. It will be apparent to those skilled in the art that modifications and variations can be made in such examples without departing from the spirit and scope of the present disclosure. For instance, features illustrated or described as part of one embodiment may be used on another embodiment to yield a still further embodiment. Thus, it is intended that the present disclosure covers such modifications and variations as come within the scope of the appended claims and their equivalents.

As used herein, terms referring to a direction or a position relative to the orientation of the trailer, such as but not limited to "vertical," "horizontal," "top," "bottom," "upper," "lower," "above," "below," "front" or "back" refer to directions and relative positions with respect to the structure and orientation of the flatbed trailer in its normal intended operational positions and use. Thus, for instance, the terms "vertical" and "upper" and "top" refer to the vertical orientation and relative upper/top positions and should be understood in that context, even with respect to a trailer that may be disposed in a different orientation. The term "parallel" encompasses offset from and parallel to, as well as coincident with.

Further, the term "or" as used in this application and the appended claims is intended to mean an inclusive "or" rather than exclusive "or." That is, unless specified otherwise, or clear from the context, the phrase "X employs A or B" is intended to mean any of the naturally inclusive permutations. That is, the phrase "X employs A or B" is satisfied by any of the following instances: X employs A; X employs B; or X employs both A and B. In addition, the articles "a" and "and" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "and," and "b" may include plural references, and the meaning of "in" may include "in" and "on." The phrase "in one embodiment," as used herein, does not necessarily refer to the same embodiment, although it may.

Referring to FIGS. 1-4B, one example of a trailer 10 for transporting a payload is provided and includes a main body 12 having an elongated main deck portion 14 and a separately movable upper deck portion 16 that is coupled to the main deck portion 14 by supporting structure, such as for example a connecting frame element or assembly 18. The main deck portion 14 and the upper deck portion 16 define generally planar surfaces and are movable, at least initially, relative to each other. The trailer 10 can be any selected type of trailer, and according to one exemplary embodiment, can be a flatbed style trailer. For the sake of simplicity, the trailer 10 is described herein as a flatbed style trailer, although the features and elements of the present disclosure are equally applicable to, and can be incorporated in, other types of trailers such as, for example box trailers, low boy trailers, step deck trailers, semi-trailers, center axle trailers, mega trailers, and the like. The illustrated upper deck portion 16 has an upper or top deck surface 20 that can optionally include a frame assembly having rail elements 22 extending outwardly therefrom. The upper deck surface 20 is circumscribed or defined by an upper frame portion having a top or upper frame element 24, an opposed bottom or lower frame element 26, and opposed side frame elements 28 and 30. The side frame elements 28, 30 form the longitudinally extending sides of the upper deck portion 16. Similarly, as shown in FIGS. 2-4B, the main deck portion 14 has a top deck surface 40 that is circumscribed or defined by a main frame assembly having a bottom or lower frame element 44 and opposed side frame elements 46 and 48. As such, the main deck surface extends from a top or upper region 42 to the lower frame element 44. The side frame elements 46, 48 form the longitudinally extending sides of the main deck portion 14. The connecting frame assembly 18 is configured for coupling the upper deck portion to the main deck portion and for coupling to a transport vehicle, such as a truck, and the upper and main deck portions are employed to primarily carry and unload the payload.

Figure 2:
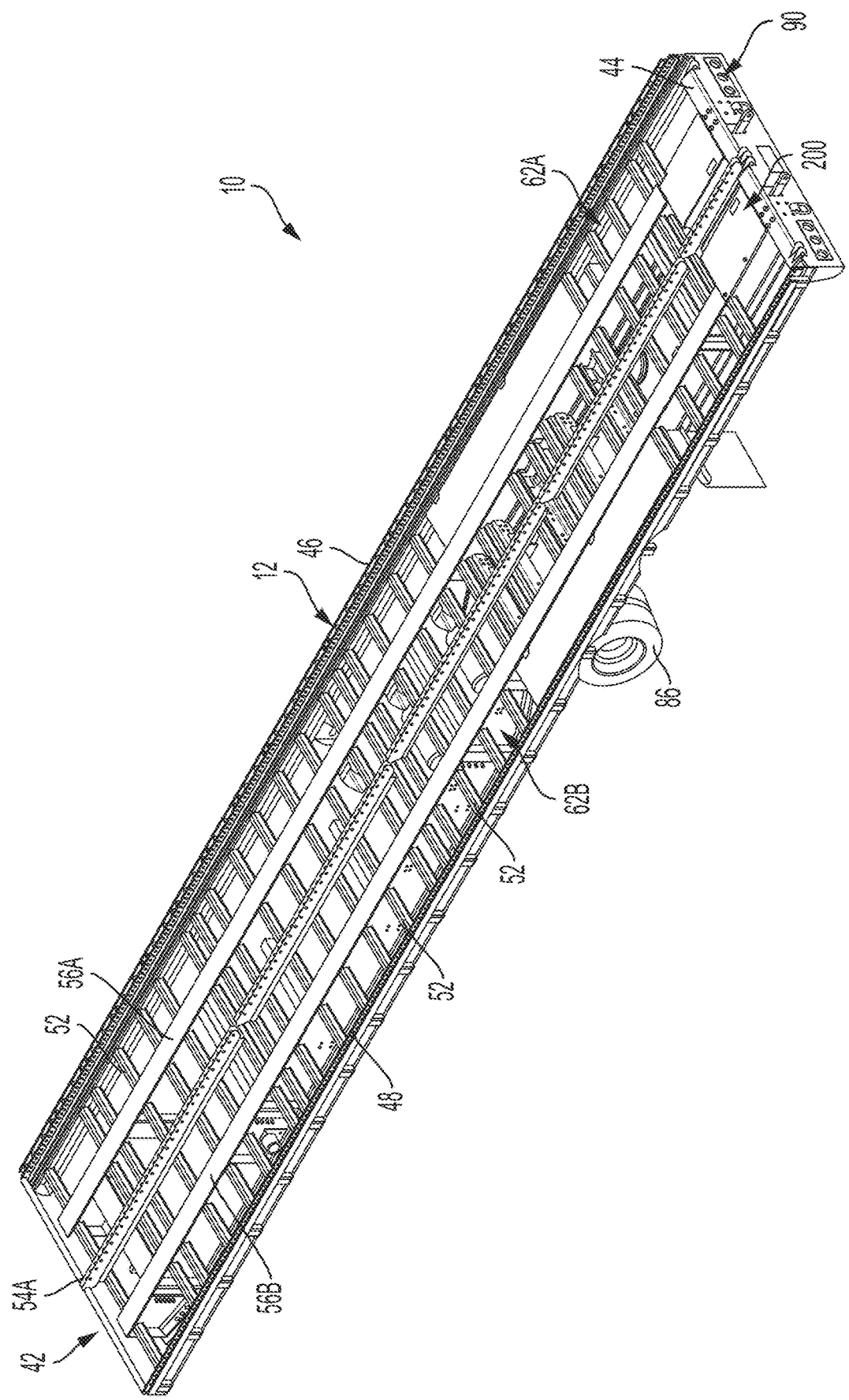
FIG. 2 is a perspective view of the frame assembly of the main deck portion of the trailer of FIG. 1.
Figure 3:
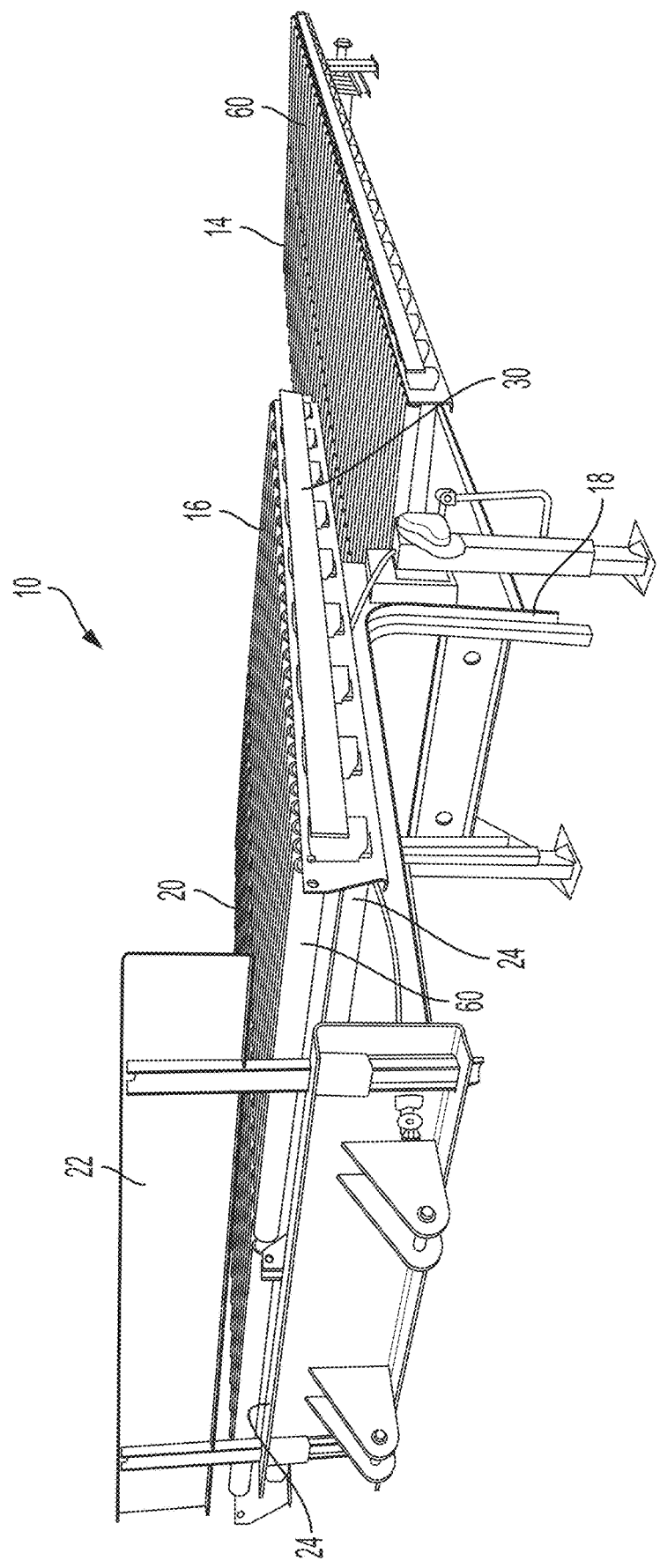
FIG. 3 is a perspective view of the front support end of the trailer of FIG. 1.

The main frame assembly of the main deck portion 14 can also include a pair of parallel and longitudinally extending roller support elements 56A, 56B that form part of the main or primary support for the main deck portion 14. The main frame assembly can also include a series of lateral support arms 52 that span between the side frame elements, such as for example between the side frame elements 46, 48 of the main deck portion 14, and are configured to be coupled thereto and to the roller support elements 56A, 56B. The lateral support arms 52 act as structural stiffeners for the main frame assembly and to help support the payload when loaded on the deck surface 40. The upper and main frame portions forming the main body 12 of the trailer can also include one or more optional longitudinal frame elements or beams disposed between the two side frame elements (e.g., between frame element 28 and 30 and between frame elements 46 and 48) and which also extend the longitudinal length of the deck portions 14, 16 from the top frame element to the bottom frame element. For example, the main deck portion 14 can include the longitudinal frame element 54A that is disposed generally at the center or mid-point between the side frame elements 46, 48 and extends generally from a top region 42 to the bottom frame element 44. Likewise, the upper deck portion 16 can include the longitudinal or center frame element 54B that is disposed generally at the mid-point between the side frame elements 28, 30 and extends generally from the top frame element 24 to the bottom frame element 26. Those of ordinary skill in the art will readily recognize that the upper and main frame portions can include any selected number of spaced apart longitudinal frame elements. The frame portions of the main and upper deck portions 14, 16 can also include roller support elements for supporting a series of roller elements that are mounted on the deck surfaces 20, 40. For example, as shown in FIG. 2, the main deck portion 40 can include the roller support elements 56A, 56B that are disposed generally at a mid-point between the side frame elements 46, 48 and the longitudinal (e.g., center) frame element 54A, respectively, and can be coupled directly to the lateral support arms 52 and to a lateral support arm 52 adjacent to the top region 42. The roller support elements 56A, 56B can also function as part of the primary structural support assembly for the main deck portion 14. The upper frame portion can also employ a similar frame structure, including for example the roller support elements. Those of ordinary skill in the art will readily recognize that the frame portions can include any selected number of roller support elements.

As further shown in FIGS. 1 and 3-4B, the main deck portion 14 and the upper deck portion 16 can also include a series of roller elements 60 that extend along the longitudinal length of each deck portion 14, 16 for allowing the payload to easily slide off of the deck surfaces 20, 40 when the deck surfaces 20, 40 are tilted. The roller elements 60 can comprise or be formed on a substantial majority or portion of the working or surface area of the deck portions 14, 16 and can span a substantial portion of the area between the two longitudinal side frame elements (e.g., between side frame elements 28, 30 and 46, 48). For example, the roller elements 60 span between the side frame elements 24, 26 of the upper deck portion 16 and between the side frame elements 46, 48 of the main deck portion 14. As used herein, the term "substantial portion" is intended to mean at least about 60% of the indicated distance or area, and preferably at least about 80% of the indicated distance or area, and most preferably at least about 90% of the indicated distance or area. By simple way of example, the roller elements 60 when constructed and mounted in the deck portions 14, 16 can span a substantial portion of the distance or area between the opposed side frame elements, such as between the side frame elements 28, 30, 46, and 48. The term area refers to the surface area of the deck portions 14, 16. Further, the roller elements 60 can optionally be formed and mounted in the upper and main deck portions 14, 16 of the trailer 10 such that the roller elements 60 cover a substantial portion of the surface area of the deck portions 14, 16 formed by the top 24, bottom 26 and 44, and side frame elements 28, 30, 46 and 48. When mounted in the frame elements, in this exemplary configuration, the roller elements 60 thus form the deck surfaces 20, 40. According to another embodiment, the roller elements 60 can form a portion of the deck surfaces 20, 40.

Figure 4B:
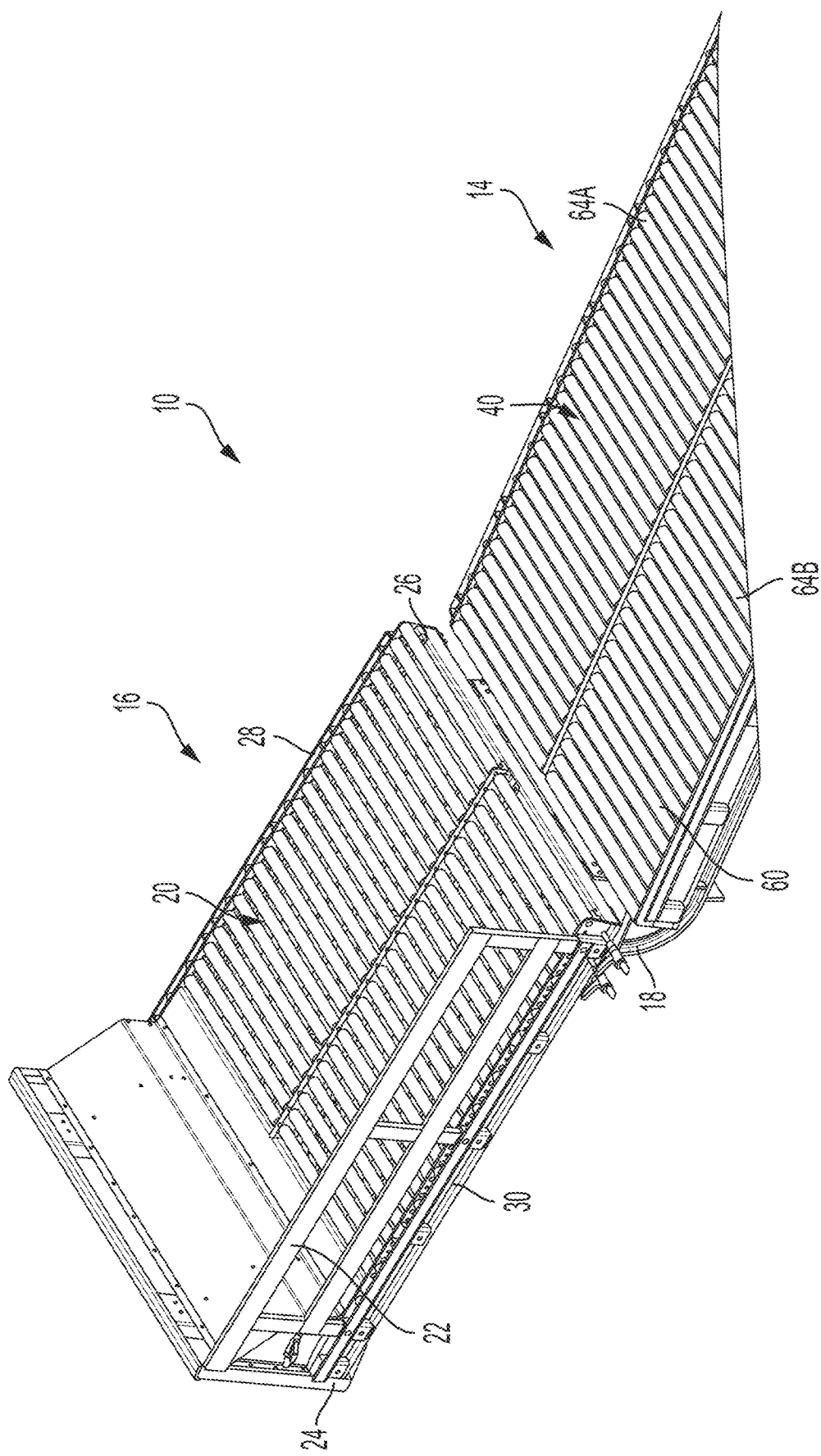
FIG. 4B is a perspective view of the front support end of the trailer of FIG. 1.
Figure 7:
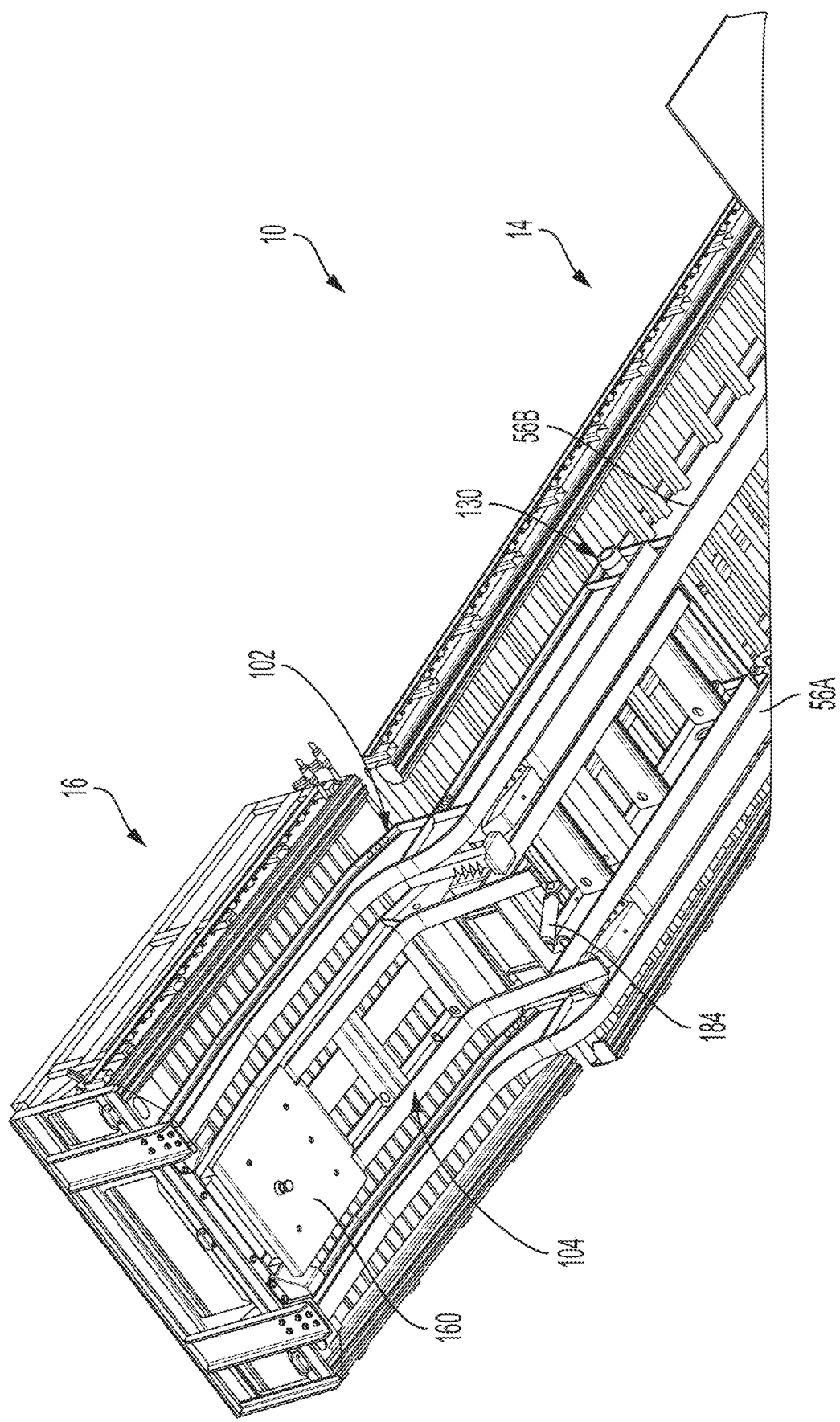
FIGS. 7 and 8 are perspective views of the underside of the deck portions of the trailer.

In the current example, the main body 12 of the trailer 10 includes the main and upper deck portions 14, 16, each of which includes frame assemblies that include top 24, bottom 26 and 44, and side frame elements 28, 30, 46 and 48, as well as the center frame elements 54A, 54B. For example, as shown in FIGS. 2 and 4A-4B, the main frame assembly includes the bottom frame element 44 and the opposed side frame elements 46 and 48. The main frame assembly also includes the center frame element 54A and the roller support elements 56A, 56B. The center frame element 54A divides the surface area of the deck surface 40 into a series of bed areas, including for example a first bed area 62A that is formed between the center frame element 54A and a first one of the longitudinally extending side frame elements, such as for example the side frame element 46, and which terminates at the top or upper region 42 and the bottom frame element 44, and a second bed area 62B that is formed between the center frame element 54A and an opposed second one of the longitudinally extending frame elements, such as the side frame element 48, and which also terminates at the top region 42 and the bottom frame element 44. A first set or row 64A of the roller elements 60 is mounted in the first bed area 62A and extends along a substantial portion of the length and width (e.g., area) of the first bed area. Further, a second set or row 64B of roller elements 60 is mounted in the second bed area 62B between the center frame element 54A and the second side frame element 48 and extends along a substantial portion of the length and width thereof. In this arrangement, the roller elements 60 can be mounted so as to form a pair of parallel rows 62A, 62B of roller elements 60 that span a substantial portion of the lateral width of the deck surface 40 and which cover a substantial portion of the surface area of the deck surfaces 20, 40. The rows 62A, 62B of the roller elements 60 also extend along nearly or completely the entire length of the deck surface 40. As such, the rollers can, in essence, form the deck surface 40. The roller elements 60 can have, for example, an outer race element that moves rotationally relative to an inner race element that is mounted to a center spindle or shaft. The center spindle can be mounted to the frame elements, such as for example to the side frame elements and to the center frame element. The upper deck portion 16 of the trailer 10 can be similarly constructed. As such, the rollers can in essence form the upper deck surface 20. According to an alternate embodiment, the main deck portion 14 of the trailer 10 can employ a single set of roller elements that extends or spans a substantial portion of the distance between the opposed side rail elements 46, 48 and between the top region 42 and the bottom frame element 44. In such a configuration, the roller elements are aligned in a row that can be positioned along a central portion of the deck surfaces 20, 40. According to still another embodiment, the main deck portion 14 of the trailer 10 can employ three or more rows of the roller elements 60 that extend or span, in combination, a substantial portion of the distance between the opposed side frame elements 46, 48 and between the top region 42 and the bottom frame element 44. In still yet further embodiments, one or more longitudinally extending land areas (e.g., non-roller areas) can be formed between one or more of the rows of the roller elements 60.

As shown in FIGS. 1, 5, and 6, the trailer 10 can also employ a movable tailgate 70 that can be alternately disposed between a closed position (FIG. 5) where the main body of the tailgate 70 extends generally vertically upwardly relative to the main deck surface 40 of the main deck portion 14 and an open position (FIG. 1), where the tailgate 70 is moved beyond a fully horizontal position relative to the main deck surface 40 so as to be able to contact the ground when the main deck portion 14 is tilted relative to the ground. The tailgate 70 is configured in a manner similar to the main deck portion and the upper deck portion. Specifically, the tailgate 70 has a main body 72 that includes a tail frame assembly that includes a pair of opposed side frame elements 74A and 74B and a pair of opposed top and bottom frame elements 74C and 74D. The tail frame assembly also includes a series of lateral support arms 76 and a center frame element 78 that is coupled to the lateral support arms 76. The roller elements 60 are preferably mounted between the center frame element 78 and the side frame elements 74A, 74B. The frame elements and center frame element can be configured and arranged, according to one embodiment, to form a first bed area 80A that seats a first set of rollers and a second bed area 80B that seats a second set of rollers. The rollers 60 assist the payload from sliding off of the deck surface 40. The frame elements can be optionally arranged to form a single bed area or to form three or more bed areas. According to one embodiment, the upper deck portion 16, the main deck portion 14, and the tailgate portion 70 employ a similar or identical arrangement of roller elements 60. The tailgate can be coupled to the bottom frame element 44 of the main deck portion 14 by one or more suitable actuatable hinges 84. The hinges 84, when actuated, form a pivot point to allow the tail gate 70 to move or swing between the open and closed positions.

The frame portion of the main deck portion 14 can also include a rear bumper panel 90, as shown for example in FIGS. 2 and 5. The rear bumper panel 90 can be coupled to the bottom frame element 44 of the main frame assembly and can include tail lights 92 and the like, as is known in the art. The trailer 10 can also employ a plurality of wheels 86 that are received and secured to one or more axles at a rear end of the main deck portion 14. The axles are secured to the underside of the deck region by, for example, a shock-absorbing suspension system. The forward or support end of the main deck portion can optionally include an axle and wheels 86, or is preferably free of an axle and wheels and is configured to couple to a transport vehicle, such as a truck.

The main deck portion 14 is coupled to the upper deck portion 16 by the connecting frame assembly 18. According to another embodiment of the present disclosure, the trailer can employ the connecting frame assembly 100 rather than the connecting frame assembly 18. As shown for example in FIGS. 6-14D, the illustrated connecting frame assembly 100 includes an outer frame subassembly 102 and an inner frame subassembly 104 that can nest within the outer frame assembly when positioned in a fully stowed position, as shown for example in FIGS. 6-9C and 14A. The inner and outer frame subassemblies 102, 104 are coupled to the roller support elements 56A, 56B of the main deck portion 14 by a pivoting assembly that forms a pivot point disposed transverse to the longitudinal axis of the main deck portion 14. As shown for example in FIGS. 7-9C, the roller support elements 56A, 56B longitudinally extend along the length of the main deck portion 14 and are spaced apart and mounted parallel relative to each other. The roller support elements form the main structural support members for the main deck portion 14. The pivoting assembly that couples the inner and outer frame subassemblies to the roller support elements can include pivoting subassemblies 130 and 140. For example, the inner and outer frame subassemblies 102, 104 are coupled to the roller support element 56B by the pivoting subassembly 130 and to the roller support element 56A by the pivoting subassembly 140. Each of the pivoting assemblies 130, 140 can include, for example, a cross pin or bolt that is mounted in suitable openings formed in the inner and outer frame subassemblies 102, 104 and in the roller support elements 56A, 56B. The cross bolt can be secured to the roller support elements by suitable securing structure, such as nuts.

Figure 8:
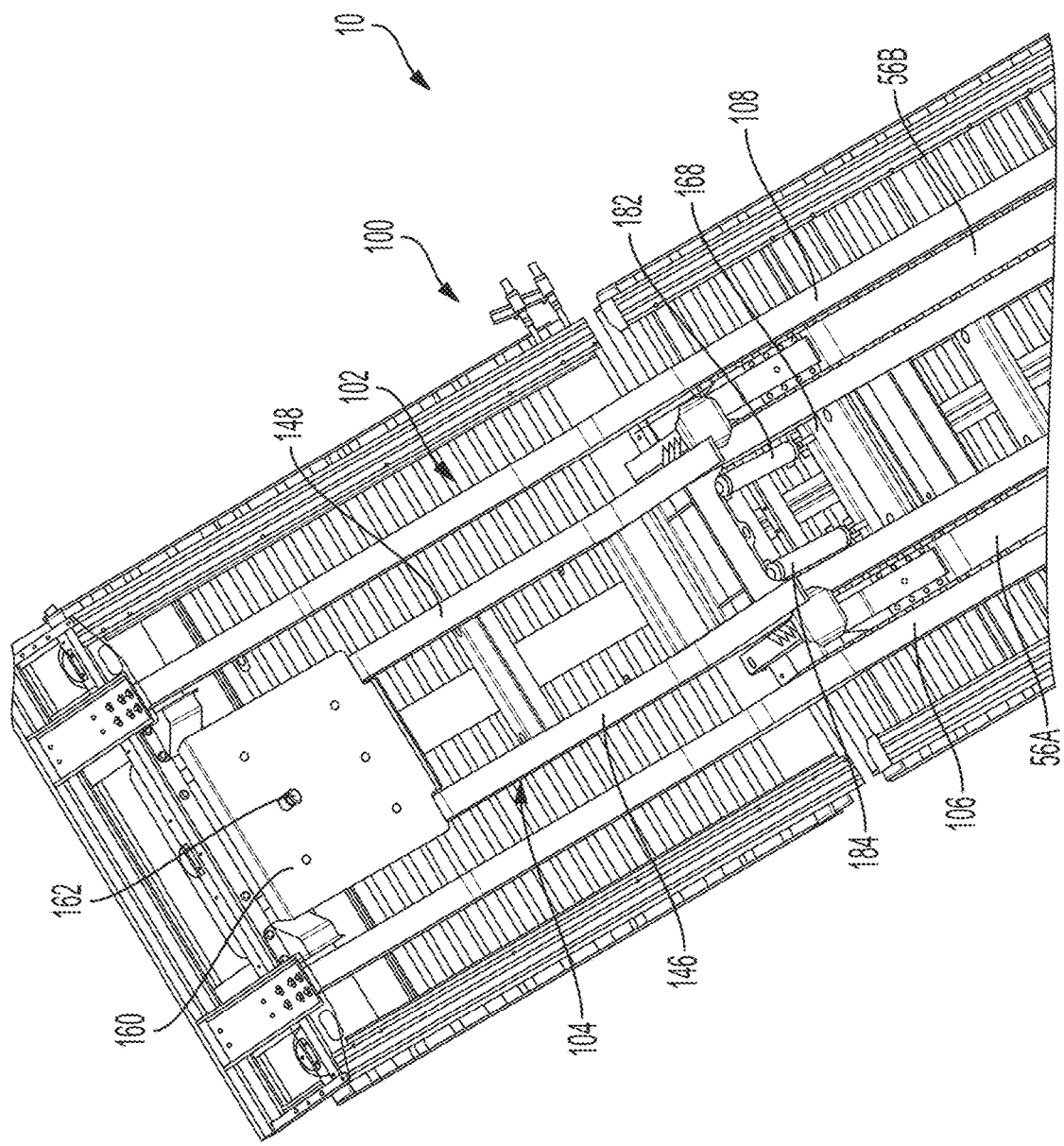
Figure 9A:
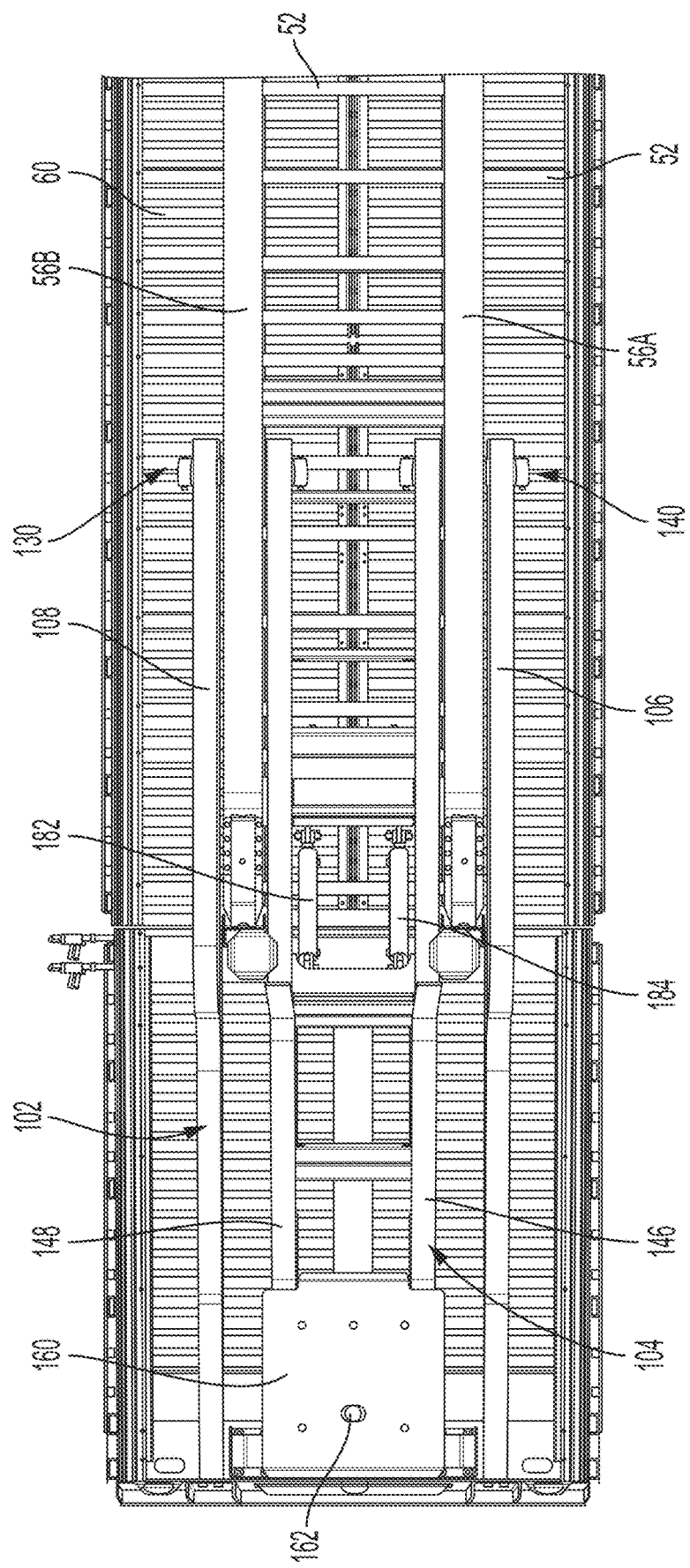
FIG. 9A is a bottom view of the underside of the deck portions of the trailer showing the inner and outer frame subassemblies.
Figure 9B:
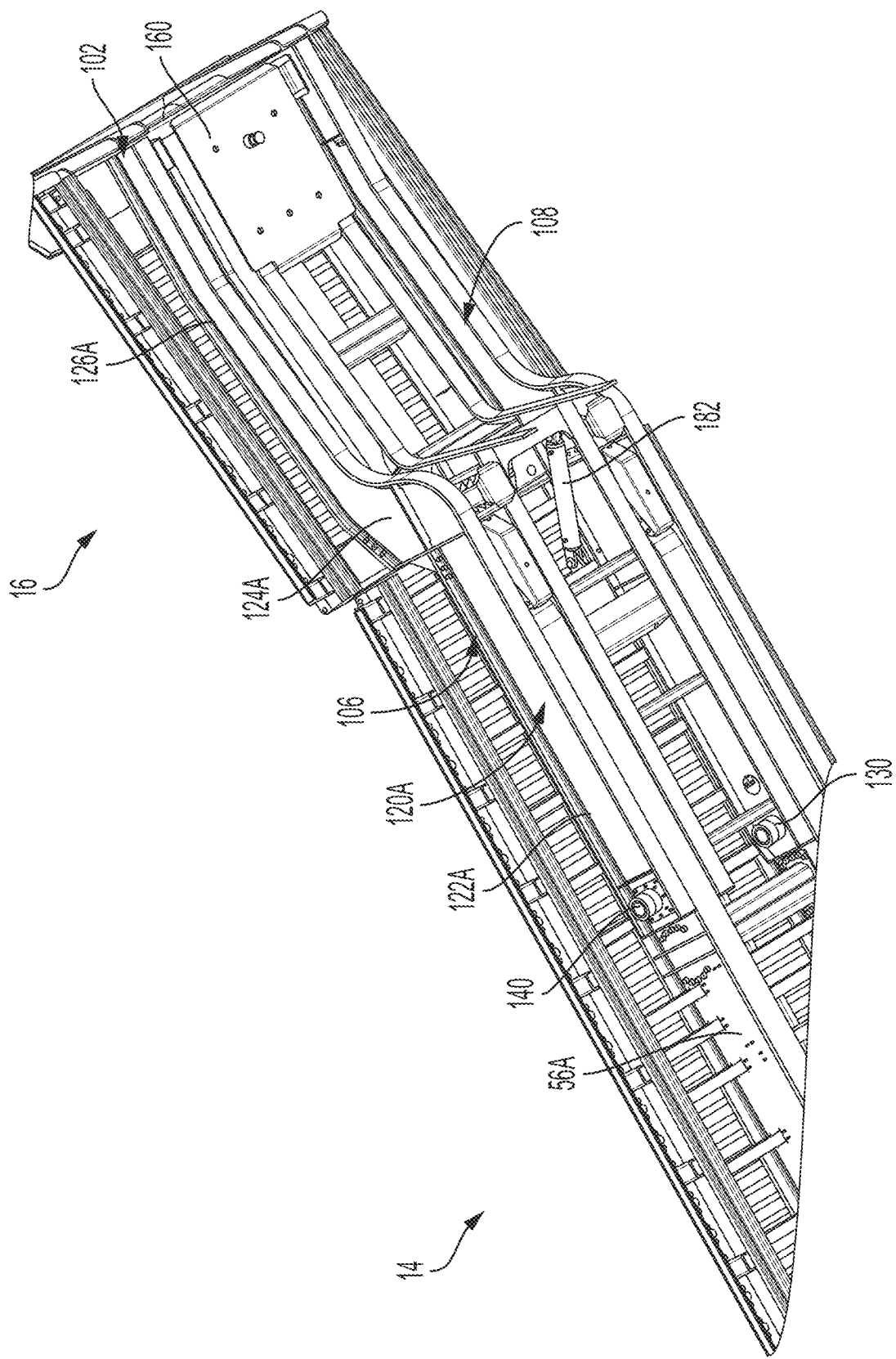
FIGS. 9B and 9C are perspective views of the underside of the deck portions of the trailer showing the inner and outer frame subassemblies.
Figure 9C:
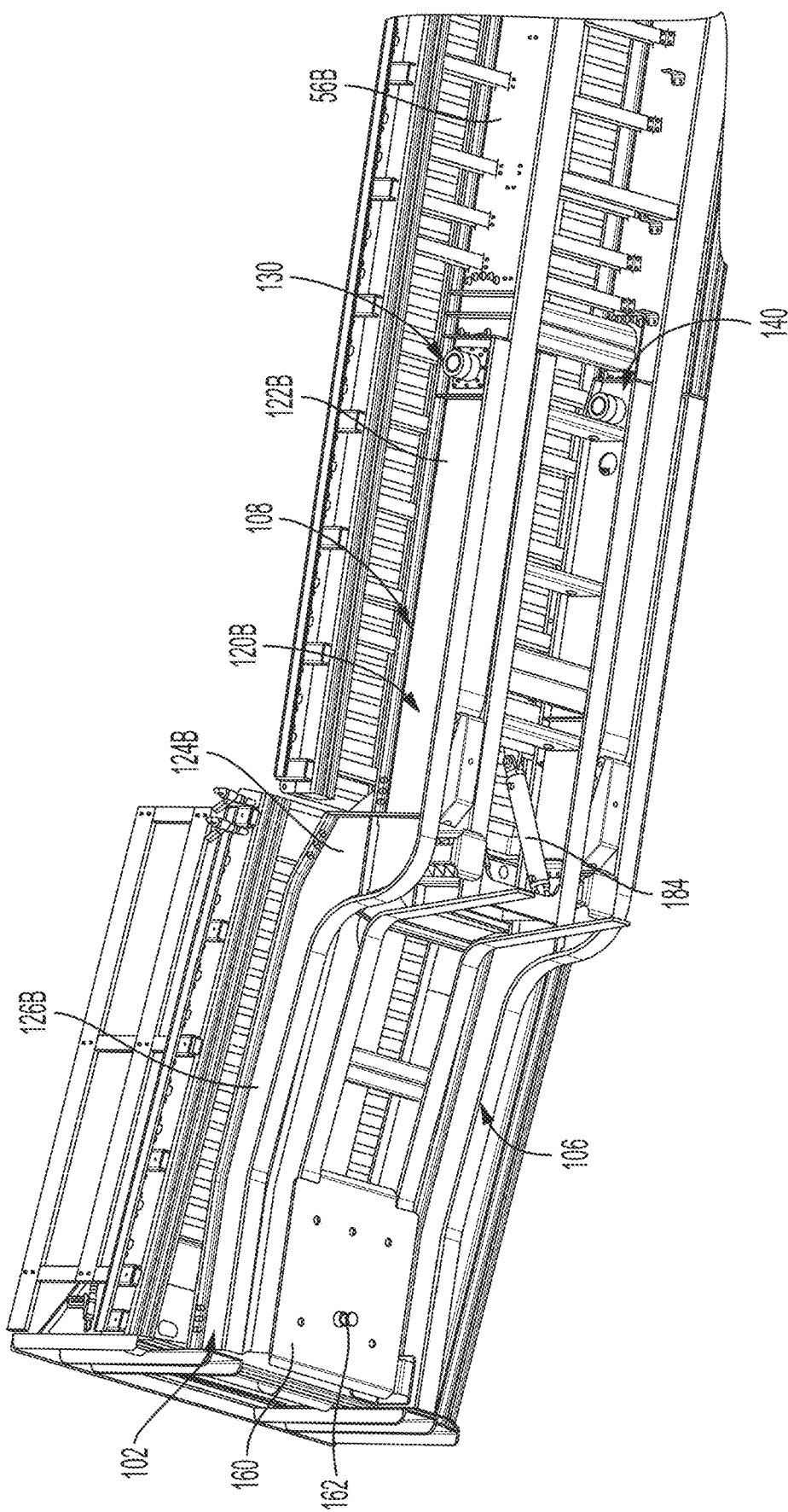

Referring to FIGS. 8-9C, the illustrated outer frame subassembly 102 can include a first outer frame arm 106 that is coupled to the roller support element 56A and an opposed second outer frame arm 108 that is coupled to the roller support element 56B. As shown for example in FIG. 9B, the first outer frame arm 106 includes a main body 120A that has a generally curved shape. According to one embodiment, the main body 120A can have a gooseneck type curve or shape at a selected portion thereof. As used herein, the term "gooseneck" is intended to mean any type of curved shape or profile, and may include a curve shape that is similar to or mimics the curve or shape of the neck of a goose. The main body 120A can include a proximal end 122A that is coupled to the roller support element 56A by the pivoting subassembly 140 and a distal end 126A that is secured to an underside of the upper deck portion 16. When attached thereto, the distal ends form part of the main support assembly for the upper deck portion 16. The distal end 126A is coupled to the proximal end 122A via a curved intermediate section or region 124A. The curved intermediate section 124A has a gooseneck type shape or curve. As shown for example in FIG. 9C, the second outer frame arm 108 includes a main body 120B that has a generally curved shape. The main body 120B can include a proximal end 122B that is coupled to the roller support element 56B by the pivoting subassembly 130 and a distal end 126B that is secured to an underside of the upper deck portion 16. The distal end 126B is coupled to the proximal end 122B via a curved intermediate 124B section or region. The curved intermediate section 124B also has a gooseneck type shape or curve. The outer frame subassembly 102 is movable or pivotable about the pivoting assemblies 130, 140 and hence can move upwardly when actuated.

Figure 10:
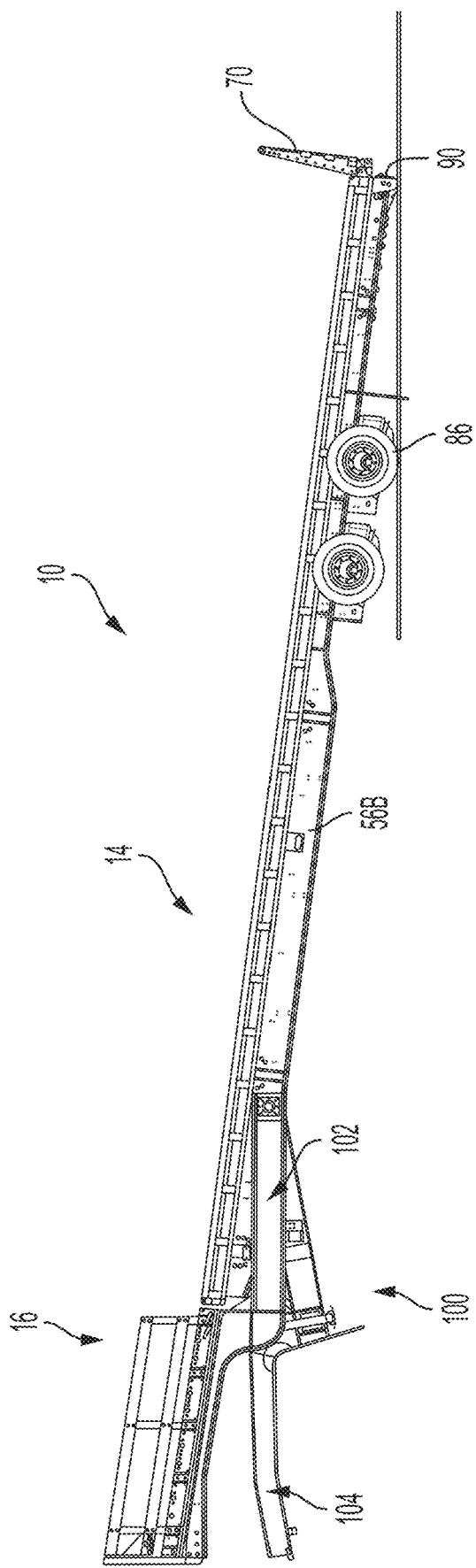
FIG. 10 is a side view of the trailer of FIG. 1 showing the inner and outer frame subassemblies in selected operating positions.
Figure 11A:
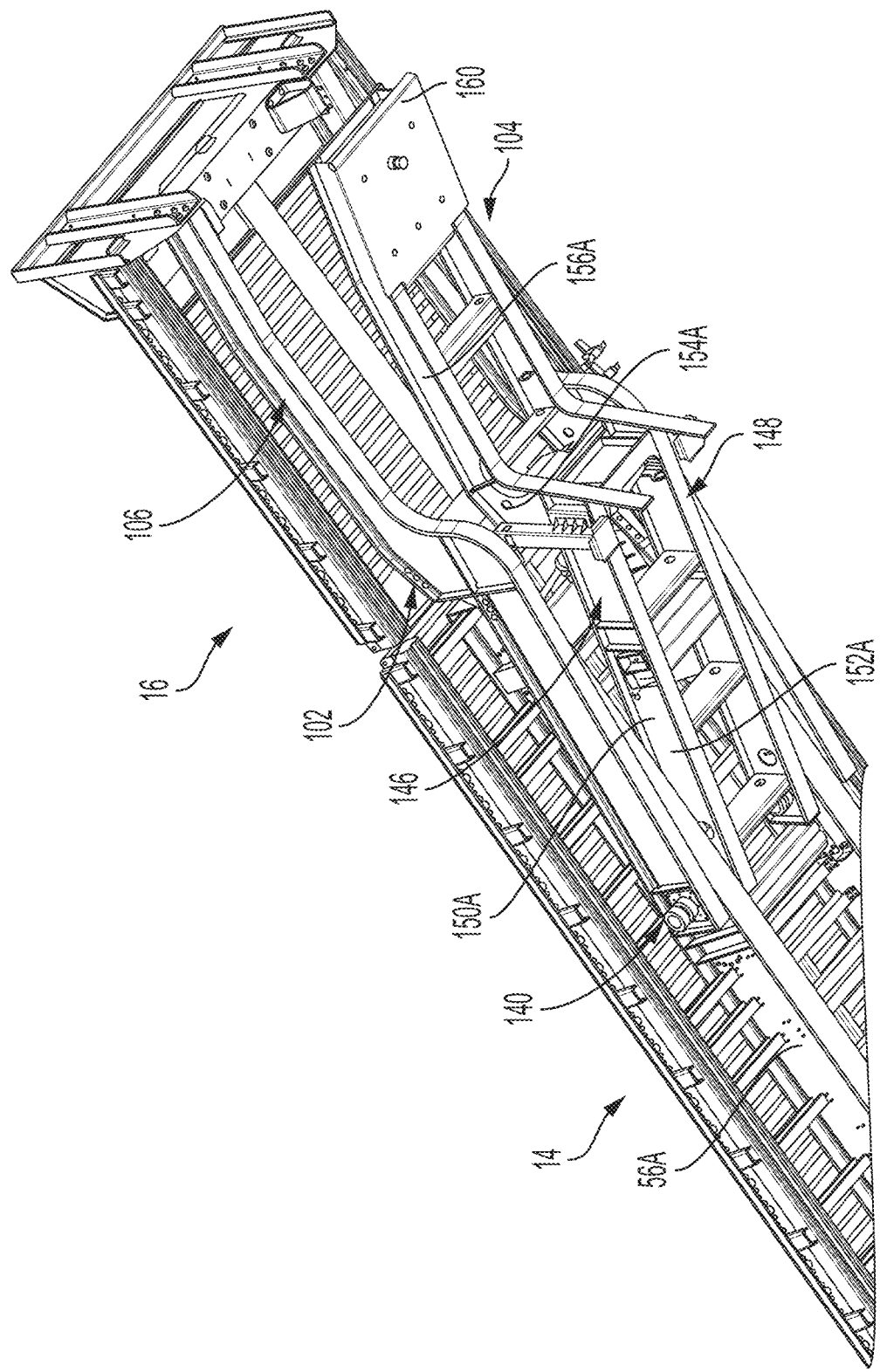
FIGS. 11A and 11B are perspective views of the underside of the deck portions of the trailer showing the inner and outer frame subassemblies in tilted operating positions.
Figure 11B:
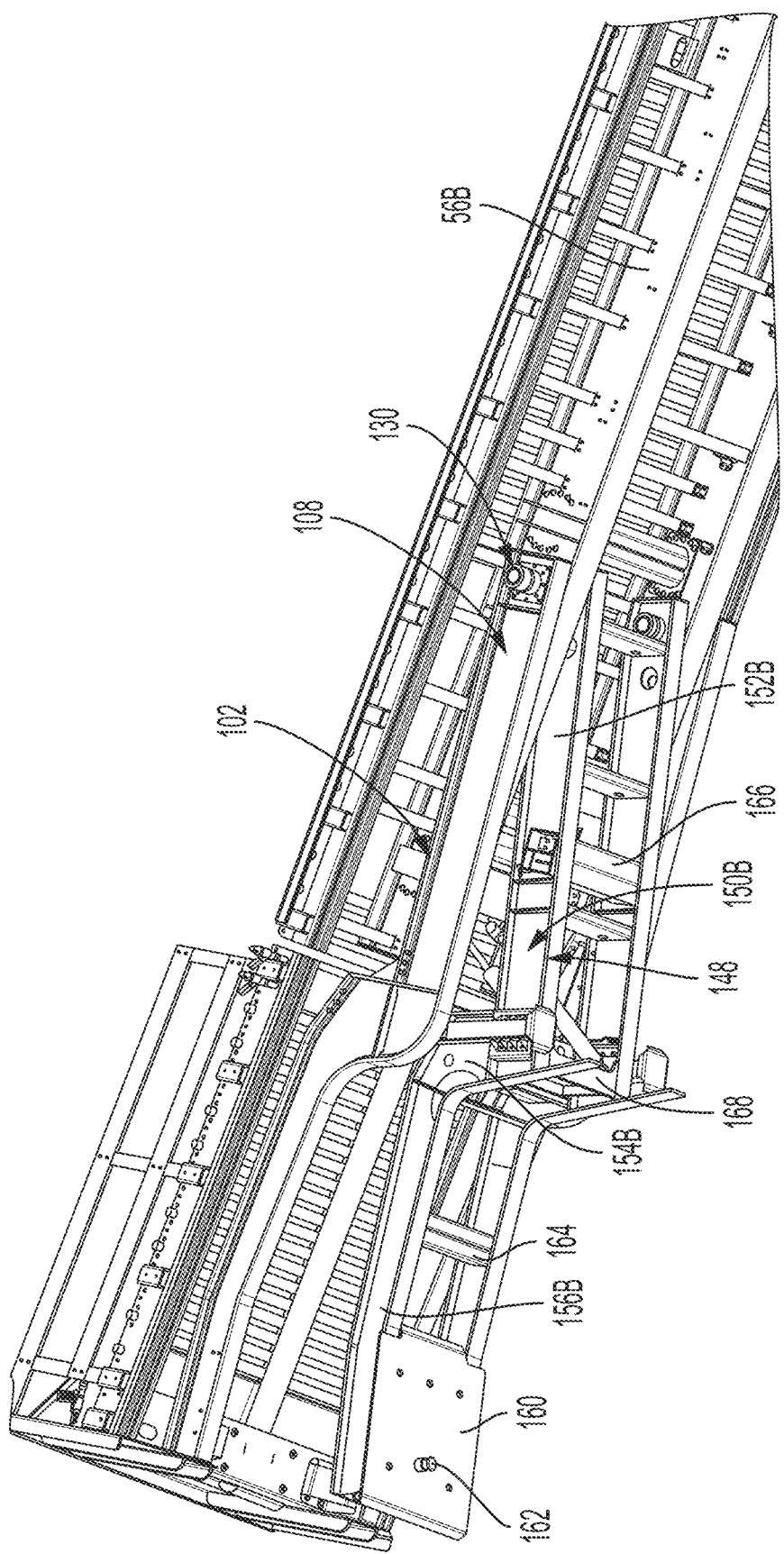

Similar to the outer frame subassembly 102, the inner frame subassembly 104 can also include a pair of frame arms, as shown for example in FIGS. 10-11B. Specifically, the inner frame subassembly 104 includes an inner frame arm 146 that is coupled to the roller support element 56A and an opposed second inner frame arm 148 that is coupled to the roller support element 56B. As shown for example in FIG. 11A, the inner frame arm 146 includes a main body 150A that has a generally curved shape. According to one embodiment, the main body 150A can have a gooseneck type curve or shape. The main body 150A includes a proximal end 152A that is coupled to the roller support element 56A by the pivoting subassembly 140 and a distal end 156A that is secured to a transport vehicle, such as a truck. The distal end 156A is coupled to the proximal end 152A via a curved intermediate section or region 154A. The curved intermediate section 154A has a gooseneck type shape or curve. As shown for example in FIG. 11B, the inner frame arm 148 includes a main body 150B that has a generally curved shape. The main body 150B can include a proximal end 152B that is coupled to the roller support element 56B by the pivoting subassembly 130 and a distal end 156B that is secured to the transport vehicle. The distal end 156B is coupled to the proximal end 152B via a curved intermediate section or region 154B. The curved intermediate section 154B also has a gooseneck type shape or curve. The inner frame arms are secured together at the distal ends 156A, 156B by a mounting plate 160 and associated cross braces, such as, for example, the cross braces 164. The mounting plate 160 can include a securing mechanism 162 for securing the inner frame subassembly 104 to the transport vehicle. The mounting plate 160 can have a selected limited amount of pivoting capability, similar to the limited amount or degree of pivoting capabilities of the fifth wheel of the transport vehicle. The inner frame subassembly 104 can include additional cross braces 166 that span between the inner frame arms 146, 148 for securing the frame arms together and to provide structural support to the entire inner frame subassembly 104.

Figure 11D:
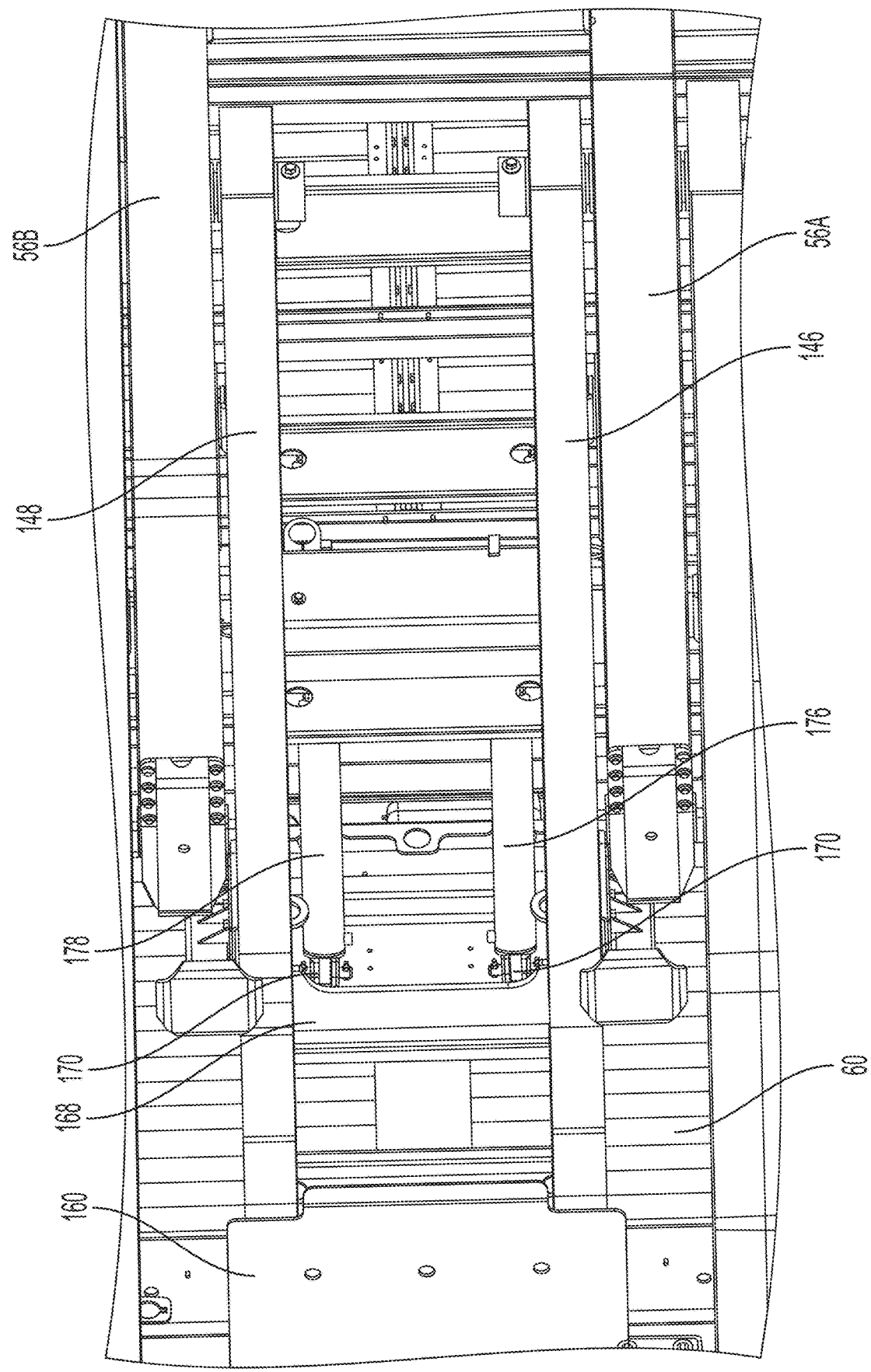
Figure 11E:
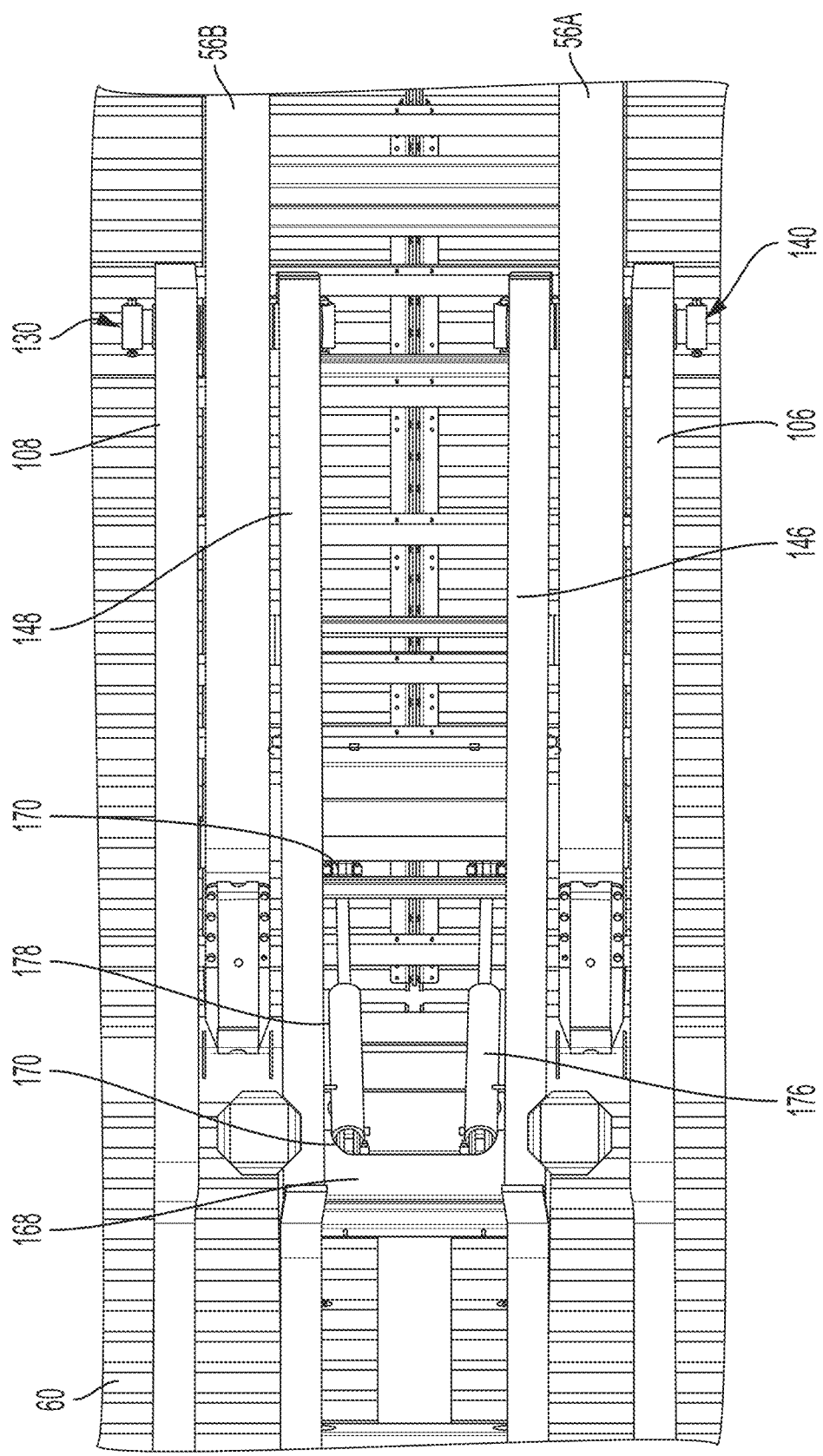
Figure 12:
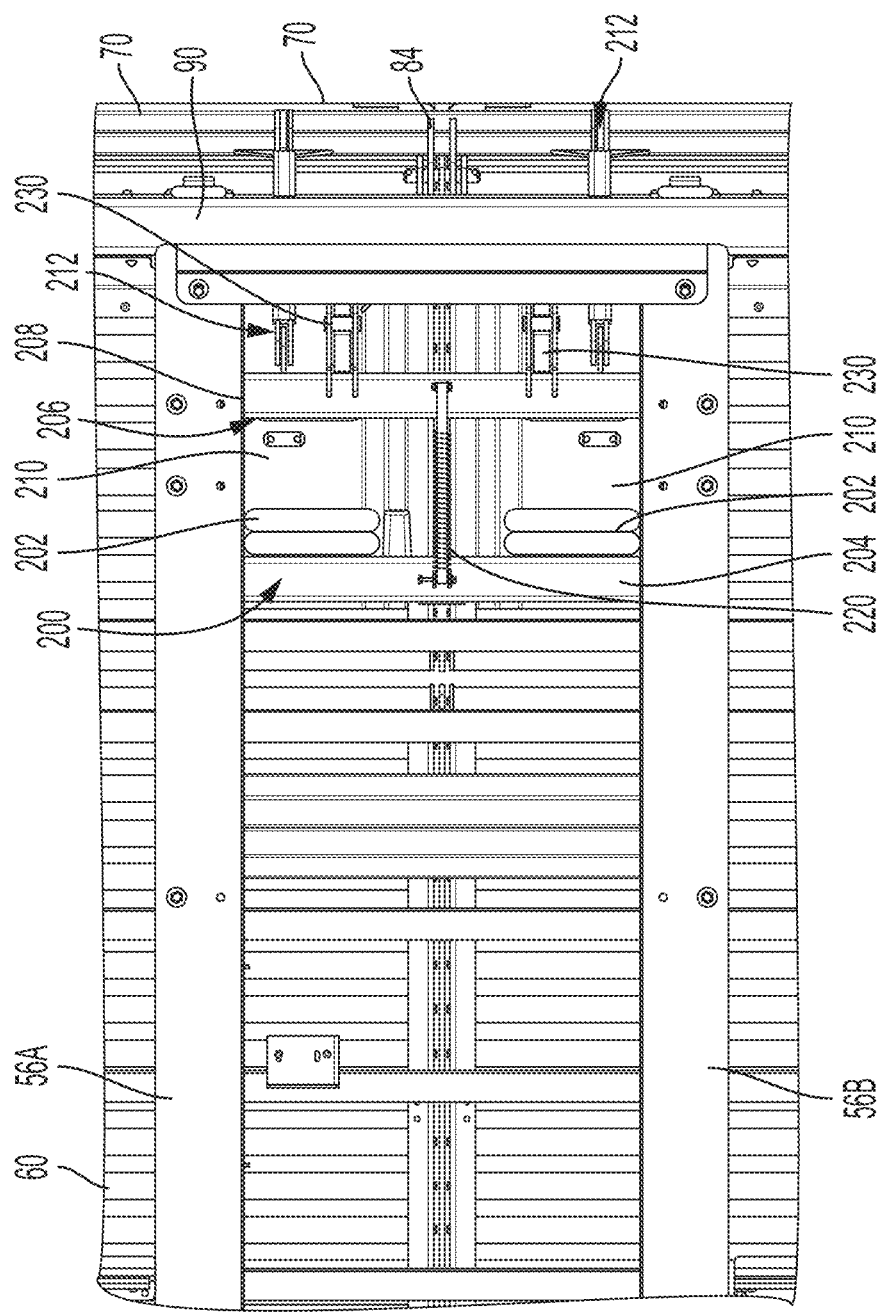
FIG. 12 is a bottom view of the underside of the main deck portion of the trailer showing an actuation assembly and associated bladders for moving the tailgate between closed and open positions.

Referring to FIGS. 11C-11E, the illustrated inner frame subassembly 104 can also include a piston support element 168 that spans between the inner frame arms 146, 148 and is coupled to the intermediate sections 154A, 154B thereof. The piston support element 168 has attached thereto a pair of spaced apart piston mounting elements 170, 170. The inner frame subassembly 104 further includes a pair of piston elements 176, 178 that are coupled to the piston mounting elements 170 at one end and to an underside of the main deck portion 14 at an opposed end. The underside of the main deck portion can also mount similar piston mounting elements 170, 170. The piston elements 176, 178 can be secured to the piston mounting elements 170 through a bolt and nut assembly. The underside of the main deck portion 14 can also include similar piston mounting elements 170 for coupling to the piston elements 176, 178. The piston elements 176, 178 can be pivotably mounted to the mounting elements 170 so as to provide a selected degree of pivoting movement. The piston elements 176, 178, when actuated, press against the underside of the main deck portion 14 so as to raise and hence tilt the support end of the main deck portion 14 adjacent to the upper deck portion 16. The inner frame subassembly 104 remains generally stationary at the point where the inner frame is secured to the transport vehicle, notwithstanding the limited pivoting capabilities of the mounting plate 160. The piston elements can be hydraulically or pneumatically actuated.

The illustrated trailer 10 can also include a selected actuation mechanism or assembly for operably moving the tailgate 70 between a normally closed position, where the tailgate extends generally vertically upwardly relative to the main deck portion 14 so as to retain the payload on the deck surfaces, and an open position where the tailgate 70 extends generally downwardly so as to allow the payload to be unloaded from the deck surfaces. As shown for example in FIGS. 12-13B, the actuation assembly 200 can include a series of mechanical structure and linkages that actuate or move the tailgate 70 between the open and closed positions. According to one embodiment, the illustrated actuation assembly 200 can include bladders 202, 202 that are secured or affixed to a bladder mounting frame member 204. The actuation assembly 200 also includes a mechanical slide subassembly 206 that includes a linear slide element 208 that includes contact regions 210, 210 that are configured to contact the bladders 202, 202. The linear slide element 208 is configured to slide longitudinally along the longitudinal axis of the main deck portion under pressure from the bladders 202, 202. The mechanical slide assembly 206 also includes a linkage assembly 212 that is coupled to the hinges 84 of the tailgate 70 at one end and to the linear slide element 208 at the opposed end. The linkage assembly 212 helps drive the tailgate between the different positions. The linear slide element 208 is moved linearly toward the tailgate when the bladders are inflated. The actuation assembly 200 can also include a securing mechanism 230 that is loaded by a biasing element 230, such as a spring, that helps retain the tailgate 70 in the closed position. Those of ordinary skill in the art will readily recognize that other expansion type structure can be employed instead of the bladders, such as bellows and the like.

The movement of the tailgate 70 between the closed and open positions is achieved through a system of mechanical connections and actuations. For example, the illustrated bladders 202, 202 can be selectively inflated and deflated with a selected fluid, such as air, so as to move the tailgate 70 between the open and closed positions. According to one embodiment, the bladders 202, 202 can be normally disposed in an inflated position (i.e., filled with air). In this position, the bladders 202 press against the linear slide element 208 and forces the linear slide element 208 to slide toward the tailgate 70. Further, the movement of the linear slide element 208 forces the linkage assembly 212 to press against the tailgate, and then the tailgate swings or pivots upwardly about the pivot point formed by the hinges 84 into the closed position. In the closed position, the spring-loaded securing mechanism 230 is engaged to secure the tailgate 70. The securing mechanism 230 can include, according to one embodiment, a swing arm having a slot and a stationary element with a hub or detent that is sized and configured to seat in the slot when the tailgate is in the closed position. The tailgate 70 is held in the closed position by the constant application of system air pressure to the bladders 202. The spring-loaded securing mechanism 230 acts as a secondary holding device during operation and as a primary holding device when the trailer is idle.

If the operator wishes to lower the tailgate 70, then the bladders 202, 202 are deflated by removing the application of air thereto and exhausting the air from the bladders. When this occurs, the weight of the tailgate 70 presses against the linkage assembly 212, which in turn presses against the linear slide element 208 to push or force the slide element toward the bladders 202. The tailgate 70 then pivots about the hinges 84 into the open position or the lowered position.

The purpose of the illustrated trailer 10 is to haul and disperse a payload. The upper and main deck portions 14, 16, as well as the tailgate 70, have a floor or deck surface that mount a series of roller elements 60, such that when the upper and main deck portions are tilted upwards, the payload rolls easily off the deck surfaces and off the back end of the trailer via gravity. For example, in operation, the front or support end of the trailer main body 12 can be coupled to the fifth wheel of a truck via the mounting plate 160 and associated securing mechanism 162, and can also be coupled to any selected hydraulic lifting system employing one or more hydraulic cylinders or piston elements. The trailer connects to the truck at the fifth wheel. The fifth wheel plate of the truck can pivot slightly as is known in the art. As such, the mounting plate 160 can also pivot to a selected degree so as to track beyond the limited pivoting capabilities of the truck fifth wheel plate. If the frame assembly pivots in the process of raising the trailer, beyond the amount of pivoting capabilities of the truck fifth wheel, the fifth wheel mounting plate 160 of the trailer can also pivot, thus allowing the trailer 10 to continue to rise. The trailer can also include or incorporate a pneumatic system for supplying air to one or more selected components, such as for example to the bladders 202, 202. Specifically, the mounting plate 160 and associated securing mechanism 162 of the inner frame subassembly 104 can be coupled and secured to the fifth wheel of the truck. The trailer 10 can be loaded with the payload by conventional techniques and the tailgate 70 of the trailer 10 can be disposed in the closed position, as shown, for example, in FIGS. 5, 6, 10, 12, 13A and 14A. The tailgate 70 can be disposed in the closed position by inflating the bladders 202, 202 with air. When inflated, the bladders 202, 202 press against the contact regions 210, 210, which in turn moves the linear slide element and attached linkage assembly 212 in the longitudinal direction. The linkage assembly 212 forces the tailgate 70 to swing upwardly about the pivot point formed by the hinges 84 into the closed position. In the closed position, the spring-loaded securing mechanism 230 is engaged to secure the tailgate 70. Also, in this position, the rods of the piston elements 176 and 178 are disposed in a fully retracted position, as shown for example in FIGS. 1, 6-9C, 11C, 11D, and 14A. When the piston elements are disposed in the fully retracted position, the main and upper deck portions 14, 16 are disposed in a normal retracted or transport position, and the upper and main deck portions are positioned as shown, for example, in FIG. 1. In the illustrated transport position, the inner frame arms 146 and 148 of the inner frame subassembly 104 are aligned with and nested within the space formed by the outer frame arms 106 and 108 of the outer frame subassembly 102.

Figure 13A:
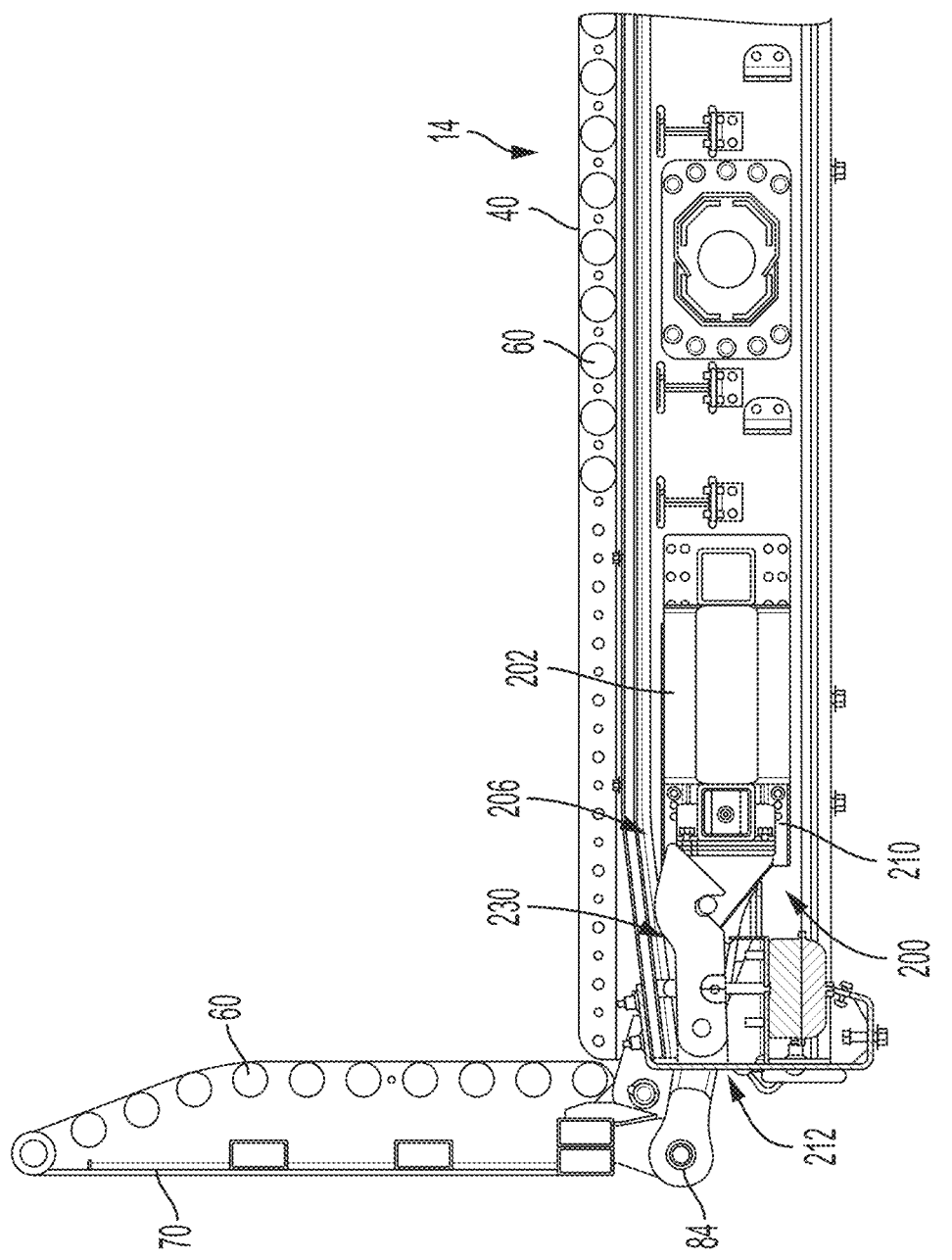
FIG. 13A is a partial, cross-sectional, side view of a rear portion of the main deck portion of the trailer showing the positions of the components of the actuation assembly when the tailgate is disposed in the closed position.
Figure 13B:
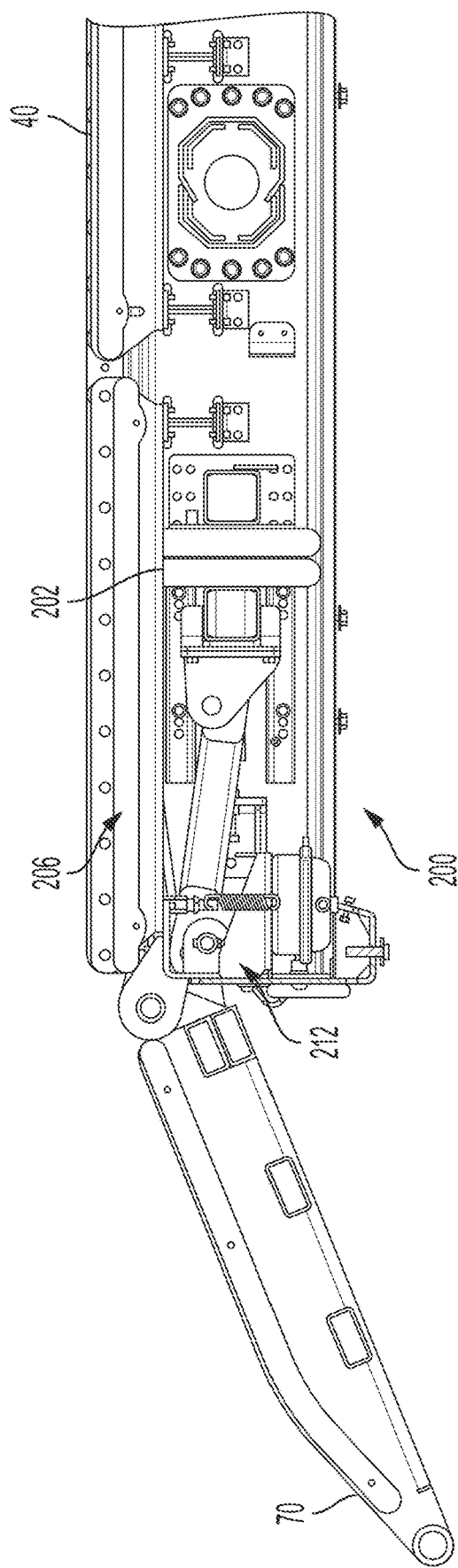
FIG. 13B is a partial, cross-sectional, side view of a rear portion of the main deck portion of the trailer showing the positions of the components of the actuation assembly when the tailgate is disposed in the open position.
Figure 14C:
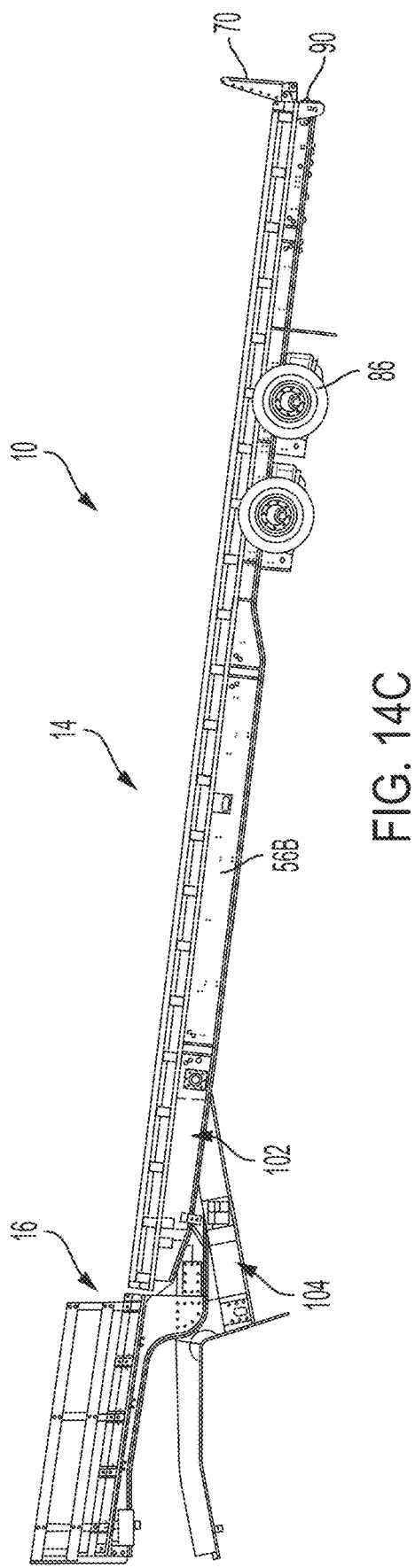
Figure 14D:
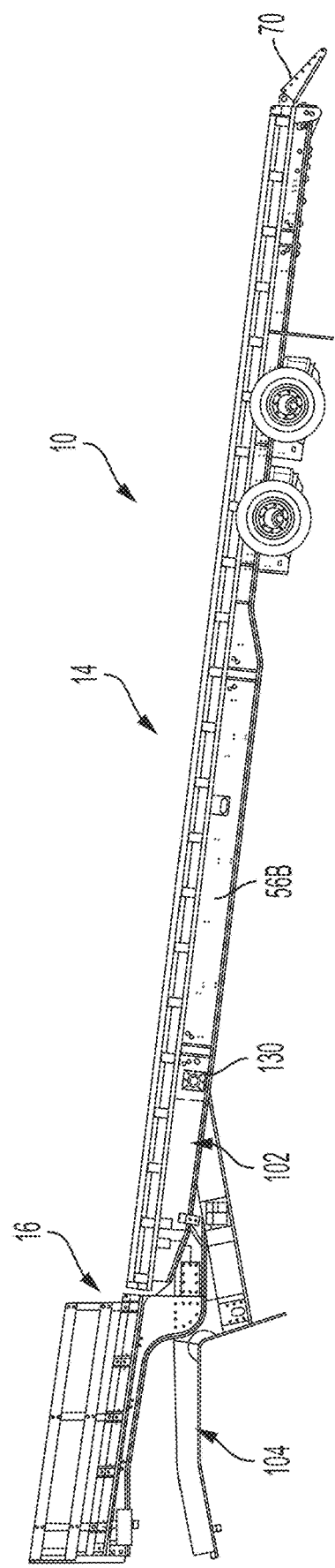

The truck operator, via a control unit that is either mounted within the truck or connected thereto by a handheld unit, can hydraulically actuate the piston elements 176 and 178 that form part of the inner frame subassembly 104. The piston elements 176, 178 can contact the frame portion of the main deck portion 14 and can selectively raise or lower the main deck. Specifically, the rods of the piston elements 176 and 178 can be actuated to move outwardly from the fully retracted position into one or more engaged positions, and when disposed in the selected engaged position, press against the underside of the main deck portion 14, and thus starts to lift and tilt the support end of the main deck portion 14 relative to the ground, as shown in FIG. 14B. The main deck portion 14 can be lifted since the inner frame subassembly 104 is secured to the truck and hence is generally stationary at the point where the inner frame is secured to the truck. During the upward movement of the main deck portion 14, the frame arms 106 and 108 of the outer frame subassembly 102 move upwardly and tilt about the pivot points formed by the pivot subassemblies 130 and 140. As the rods of the piston elements 176 and 178 continue to press against the main deck portion 14, the main deck portion continues to rise and tilt until the deck surface 40 of the main deck portion 14 is aligned with the deck surface 20 of the upper deck portion 16, as shown for example in FIGS. 10, 11A, 11B and 14C. The frame of the main deck portion 14 can then engage with the frame portion of the bottom or rear end portion of the upper deck portion 16 such that the main and upper deck portions 14, 16 are tilted or raised in unison. In this position, as shown for example in FIG. 14C, the outer frame arms 106, 108 are placed out of alignment with the inner frame arms 146, 148. As the piston elements continue to press upwardly the main deck portion, the main deck portion and the upper deck portion move together until the deck surfaces 20, 40 are raised and tilted into a fully deployed position, as shown for example in FIGS. 11B, 11E, 14C, and 14D. As the upper and main deck portions continue to be tilted at or near the fifth wheel portion of the truck, the bumper panel portion 90 of the flatbed trailer 10 is moved closer to the ground. The deck portions 14, 16 continue to be raised until the bumper panel 90 contacts or is disposed immediately adjacent to the ground. In this position, the operator can then actuate the tailgate 70, such that the tailgate moves into the open position from the closed position. To effectuate this movement, the control unit can exhaust the air within the bladders 202, 202 such that the bladders move from the inflated position into a deflated position, as shown in FIG. 13B. When the bladders 202 are deflated, the weight of the tailgate 70 presses against the linkage assembly 212, which in turn presses against the linear slide element 208 to push or force the slide element toward the bladders 202. The tailgate 70 then pivots about the hinges 84 into the open or lowered position. As such, the main deck portion 14 can be selectively movable or tiltable independently of the upper deck portion 16. The payload, which had been retained on the deck surfaces 20, 40 by the closed tailgate 70, can then freely roll or move off of the deck surfaces 20, 40 by the free spinning action of the roller elements 60 mounted on the deck surfaces 20, 40, as well as on the tailgate 70. If needed, the operator can move the truck forward to allow any remaining payload still located on the deck surface 40 to slide freely off of the flatbed trailer. The operator can then reverse the process to place the flatbed trailer back into the normal travel position.

According to further embodiments of the present disclosure, the deck surfaces 20, 40 of the trailer 10 can include multiple sets of roller elements 60 that are dispersed or arranged along one or more of the deck surfaces 20, 40 in an intermittent or non-continuous manner. For example, the deck surfaces can have one or more relatively flat non-roller or land deck sections formed along the deck surfaces that are disposed between the sets of roller elements in any selected arrangement or pattern. According to one example, the land deck section can be formed in a central portion of the deck surfaces to form a walkway. As such, the deck surfaces can form multiple bed areas, such as two or more bed areas, that are arranged so as to be separated from each other by the flat non-roller deck sections. Those of ordinary skill in the art will readily recognize that many different arrangements of the roller elements and flat non-roller deck sections are contemplated by the present disclosure.

It will thus be seen that the present disclosure efficiently attains the objects set forth above, among those made apparent from the preceding description. Since certain changes may be made in the above constructions without departing from the scope of the present disclosure, it is intended that all matter contained in the above description or shown in the accompanying drawings be interpreted as illustrative and not in a limiting sense.

It is also to be understood that the following claims are to cover all generic and specific features of the present disclosure described herein, and all statements of the scope of the present disclosure which, as a matter of language, might be said to fall therebetween.

We claim:

1. A trailer, comprising
a main deck portion having a main frame assembly extending along a longitudinal axis having opposed side frame elements and opposed top and bottom frame elements that are coupled together, the main frame assembly also including first and second parallel and longitudinally extending rows of roller support elements, and wherein the frame elements and the roller support elements define a main deck surface,
an upper deck portion having an upper frame assembly having opposed side frame elements and opposed top and bottom frame elements that are coupled together, and wherein the frame elements of the upper deck portion define an upper deck surface,
a connecting frame assembly for coupling together the main deck portion and the upper deck portion,
a plurality of roller elements arranged in one or more rows and mounted in one or more of the main deck surface and the upper deck surface so as to cover a substantial portion of one of the main deck surface and the upper deck surface, and
a tailgate coupled to the main deck portion and movable between a closed position and an open position, wherein the tailgate includes a tail frame assembly having opposed side frame elements and opposed top and bottom frame elements that are coupled together and first and second parallel and longitudinally extending rows of roller support elements.

2. The trailer of claim 1, wherein each of the upper frame assembly and the main frame assembly further comprises a plurality of lateral support arms that span between the side frame elements.

3. The trailer of claim 2, wherein the plurality of lateral support arms in the main frame assembly extend between the side frame elements and the first and second roller support elements and function as structural stiffeners for the main frame assembly to help support a payload when loaded on the main deck surface.

4. The trailer of claim 2, wherein each of the upper frame assembly and the main frame assembly further comprises one or more longitudinal frame elements disposed between the side frame elements and which extend along a longitudinal length of the upper deck surface and the main deck surface from the top frame element to the bottom frame element.

5. The trailer of claim 4, wherein the one or more longitudinal frame elements are disposed along a central portion of the deck surfaces.

6. The trailer of claim 4, wherein the one or more longitudinal frame elements of the main frame assembly divides a surface area of the main deck surface into a plurality of bed areas having a first bed area that is formed between the one or more longitudinal frame elements and a first one of the longitudinally extending side frame elements, and a second bed area that is formed between the one or more longitudinal frame elements and an opposed second one of the longitudinally extending side frame elements, and
wherein the one or more longitudinal frame elements of the upper frame assembly divides a surface area of the upper deck surface into a plurality of bed areas having a first bed area that is formed between the one or more longitudinal frame elements and a first one of the longitudinally extending side frame elements, and a second bed area that is formed between the one or more longitudinal frame elements and an opposed second one of the longitudinally extending side frame elements.

7. The trailer of claim 6, wherein each of the first and second bed areas of the main deck surface mounts a plurality of the roller elements arranged in a row to form the first and second rows of the roller elements, and wherein each of the first and second bed areas of the upper deck surface mounts a plurality of the roller elements arranged in a row to form the first and second rows of the roller elements.

8. The trailer of claim 7, wherein the tail frame assembly further comprises,
a plurality of lateral support arms, and
one or more longitudinal frame elements that are coupled to the plurality of lateral support arms,
wherein the side frame elements, the top and bottom frame elements, the lateral support arms, and the one or more longitudinal frame elements define a tailgate deck surface, and
wherein the one or more longitudinal frame elements divides a surface area of the tailgate deck surface into a plurality of bed areas having a first bed area that is formed between the one or more longitudinal frame elements and a first one of the longitudinally extending side frame elements, and a second bed area that is formed between the one or more longitudinal frame elements and an opposed second one of the longitudinally extending side frame elements.

9. The trailer of claim 8, wherein each of the first and second bed areas of the tailgate deck surface mounts a plurality of the roller elements arranged in a row to form the first and second rows of the roller elements.

10. The trailer of claim 1, wherein the main deck surface includes one or more relatively flat non-roller sections.

11. The trailer of claim 1, wherein the main deck portion is independently movable relative to the upper deck portion.

12. The trailer of claim 1, wherein the connecting frame assembly comprises
an outer frame assembly having a first outer frame arm and a second outer frame arm, and
an inner frame assembly having a first inner frame arm and a second inner frame arm,
wherein the outer frame assembly and the inner frame assembly are coupled to the first and second roller support elements.

13. The trailer of claim 12, wherein the outer frame assembly and the inner frame assembly are coupled to the first roller support element by a first pivoting assembly to form a first pivot point and to the second roller support element by a second pivoting assembly to form a second pivot point.

14. The trailer of claim 13, wherein the first outer frame arm of the outer frame assembly comprises
a proximal portion coupled to the first roller support element by the first pivoting assembly,
an opposed distal portion coupled to an underside of the upper deck portion, and
a curved intermediate portion coupling together the proximal portion and the distal portion, and
wherein the second outer frame arm of the outer frame assembly includes
a proximal portion coupled to the second roller support element by the second pivoting assembly,
an opposed distal portion coupled to an underside of the upper deck portion, and
a curved intermediate portion coupling together the proximal portion and the distal portion.

15. The trailer of claim 14, wherein the first inner frame arm of the inner frame assembly comprises
a proximal portion coupled to the first roller support element by the first pivoting assembly,
an opposed distal portion coupled to an underside of the upper deck portion, and
a curved intermediate portion coupling together the proximal portion and the distal portion, and
wherein the second inner frame arm of the inner frame assembly includes
a proximal portion coupled to the second roller support element by the second pivoting assembly,
an opposed distal portion coupled to an underside of the upper deck portion, and
a curved intermediate portion coupling together the proximal portion and the distal portion.

16. The trailer of claim 15, wherein the curved intermediate portions are configured to have a gooseneck type shape.

17. The trailer of claim 15, wherein the outer frame assembly is pivotably movable about the first and second pivot points.

18. The trailer of claim 17, wherein the inner frame assembly further comprises first and second piston elements coupled at one end to the inner frame assembly and coupled at an opposed end to an underside of the main deck portion.

19. The trailer of claim 18, wherein, upon actuation of the first and second piston elements, the piston elements press against the underside of the main deck portion so as to tilt the main deck portion about the first and second pivot points.

20. The trailer of claim 12, further comprising an actuation assembly coupled to an underside of the main deck portion for moving the tailgate between the closed position and the open position.

21. The trailer of claim 20, wherein the actuation assembly comprises
first and second bladders coupled at a first end to the underside of the main deck portion,
a linear slide element coupled to a second end of the first and second bladders, and
a linkage assembly coupled at one end to the linear slide element and at an opposed end to the tailgate.

22. The trailer of claim 21, further comprising a securing mechanism for securing the tailgate in the closed position.

23. The trailer of claim 21, wherein, when the bladders are actuated, the bladders move the linear slide element and the linkage assembly in a longitudinal direction toward the tailgate so as to move the tailgate into the closed position.

24. The trailer of claim 23, wherein, when the bladders are not actuated, the linear slide element and the linkage assembly moves in the longitudinal direction away from the tailgate so as to move the tailgate into the open position.

25. A trailer, comprising
- a main deck portion having a main frame assembly extending along a longitudinal axis having opposed side frame elements and opposed top and bottom frame elements that are coupled together, the main frame assembly also including first and second parallel and longitudinally extending roller support elements, and wherein the frame elements and the roller support elements define a main deck surface,
- an upper deck portion having an upper frame assembly having opposed side frame elements and opposed top and bottom frame elements that are coupled together, and wherein the frame elements of the upper deck portion define an upper deck surface,
- a connecting frame assembly for coupling together the main deck portion and the upper deck portion,
- a plurality of roller elements arranged in one or more rows and mounted in one or more of the main deck surface and the upper deck surface so as to cover a substantial portion of one of the main deck surface and the upper deck surface, and
- a tailgate coupled to the main deck portion and movable between a closed position and an open position,
- wherein the connecting frame assembly includes an outer frame assembly having a first outer frame arm and a second outer frame arm, and an inner frame assembly having a first inner frame arm and a second inner frame arm, wherein the outer frame assembly and the inner frame assembly are coupled to the first and second roller support elements, and wherein the outer frame assembly and the inner frame assembly are coupled to the first roller support element by a first pivoting assembly to form a first pivot point and to the second roller support element by a second pivoting assembly to form a second pivot point,
- wherein the first outer frame arm of the outer frame assembly includes
  - a proximal portion coupled to the first roller support element by the first pivoting assembly,
  - an opposed distal portion coupled to an underside of the upper deck portion, and
  - a curved intermediate portion coupling together the proximal portion and the distal portion, and
- wherein the second outer frame arm of the outer frame assembly includes
  - a proximal portion coupled to the second roller support element by the second pivoting assembly,
  - an opposed distal portion coupled to an underside of the upper deck portion, and
  - a curved intermediate portion coupling together the proximal portion and the distal portion, and
- wherein the first inner frame arm of the inner frame assembly includes
  - a proximal portion coupled to the first roller support element by the first pivoting assembly,
  - an opposed distal portion coupled to an underside of the upper deck portion, and
  - a curved intermediate portion coupling together the proximal portion and the distal portion, and
- wherein the second inner frame arm of the inner frame assembly includes
  - a proximal portion coupled to the second roller support element by the second pivoting assembly,
  - an opposed distal portion coupled to an underside of the upper deck portion, and
  - a curved intermediate portion coupling together the proximal portion and the distal portion.

26. A trailer, comprising
- a main deck portion having a main frame assembly extending along a longitudinal axis having opposed side frame elements and opposed top and bottom frame elements that are coupled together, the main frame assembly also including first and second parallel and longitudinally extending roller support elements, and wherein the frame elements and the roller support elements define a main deck surface,
- an upper deck portion having an upper frame assembly having opposed side frame elements and opposed top and bottom frame elements that are coupled together, and wherein the frame elements of the upper deck portion define an upper deck surface,
- a connecting frame assembly for coupling together the main deck portion and the upper deck portion,
- a plurality of roller elements arranged in one or more rows and mounted in one or more of the main deck surface and the upper deck surface so as to cover a substantial portion of one of the main deck surface and the upper deck surface, and
- a tailgate coupled to the main deck portion and movable between a closed position and an open position,
- wherein the connecting frame assembly includes
  - an outer frame assembly having a first outer frame arm and a second outer frame arm, and
  - an inner frame assembly having a first inner frame arm and a second inner frame arm,
  - wherein the outer frame assembly and the inner frame assembly are coupled to the first and second roller support elements,
- an actuation assembly coupled to an underside of the main deck portion for moving the tailgate between the closed position and the open position, wherein the actuation assembly includes
  - first and second bladders coupled at a first end to the underside of the main deck portion,
  - a linear slide element coupled to a second end of the first and second bladders, and
  - a linkage assembly coupled at one end to the linear slide element and at an opposed end to the tailgate.

* * * * *